United States Patent
Yamaguchi et al.

(10) Patent No.: US 7,088,859 B1
(45) Date of Patent: Aug. 8, 2006

(54) APPARATUS FOR PROCESSING MACHINE-READABLE CODE PRINTED ON PRINT MEDIUM TOGETHER WITH HUMAN-READABLE INFORMATION

(75) Inventors: Nobuyasu Yamaguchi, Kawasaki (JP); Tsugio Noda, Kawasaki (JP); Fumitaka Abe, Kawasaki (JP); Shoji Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/563,891

(22) Filed: May 3, 2000

(30) Foreign Application Priority Data

Jun. 3, 1999 (JP) ................................. 11-156208

(51) Int. Cl.
*G06K 9/00* (2006.01)
*G06K 9/20* (2006.01)

(52) U.S. Cl. ...................... 382/181; 382/317

(58) Field of Classification Search ................. 382/175, 382/176, 179, 185, 186, 187, 182, 183, 282, 382/283, 317, 318; 358/453, 462; 235/435, 235/436, 462.01, 462.07, 462.09, 462.1
See application file for complete search history.

(56) References Cited

U.S. PATENT DOCUMENTS

| | | | | |
|---|---|---|---|---|
| 4,488,679 A | * | 12/1984 | Bockholt et al. | 235/469 |
| 4,983,996 A | * | 1/1991 | Kinoshita | 396/312 |
| 4,992,650 A | * | 2/1991 | Somerville | 235/462.1 |
| 5,140,650 A | * | 8/1992 | Casey et al. | 382/283 |
| 5,276,472 A | * | 1/1994 | Bell et al. | 396/312 |
| 5,305,396 A | * | 4/1994 | Betts et al. | 382/175 |
| 5,428,694 A | * | 6/1995 | Betts et al. | 382/317 |
| 5,802,179 A | * | 9/1998 | Yamamoto | 380/51 |
| 5,873,735 A | * | 2/1999 | Yamada et al. | 434/316 |
| 5,995,193 A | * | 11/1999 | Stephany et al. | 355/31 |
| 6,163,656 A | * | 12/2000 | Yoshioka | 396/429 |
| 6,349,194 B1 | * | 2/2002 | Nozaki et al. | 434/308 |
| 6,397,184 B1 | * | 5/2002 | Walker | 704/270 |
| 2003/0071127 A1 | * | 4/2003 | Bryant et al. | 235/462.43 |

FOREIGN PATENT DOCUMENTS

EP 0743614 * 11/1996
JP 6-343132 12/1994

* cited by examiner

*Primary Examiner*—Samir A. Ahmed
(74) *Attorney, Agent, or Firm*—Staas & Halsey LLP

(57) ABSTRACT

An information processing system which processes machine-readable code information which is printed, together with human-readable information, on a print medium. The apparatus includes a reading unit which reads the machine-readable code information, a decoding unit which decodes the machine-readable code information read by the reading unit, to generate decoded information, an information storing unit which stores at least a portion of the decoded information as stored information, and a processing unit which determines a processing operation to be performed, based on the decoded information and the stored information, and performs the determined processing operation.

8 Claims, 31 Drawing Sheets

— 130

BRIEF OUTLINE OF "HOUKYOUJIN NO SHI"
    A message hidden in a popular movie revives a prototype which is buried deeply in the subconscious of a number of children, so that they kill themselves.
    People tossed by something primitive, which exists at the bottom of human mind, are gradually calmed by efforts of a psychiatrist.

COMPETITION IN CELEBRATION OF
THE SECOND ANNIVERSARY OF
THE FOUNDING

140a 140b-1

HEADER INFORMATION 140b-2

APPLICATION FORM

Edmund Husserl, Ideen, phenomenology, philosophy, intersubjectivity, epoke, phenomenological reduction, Heidegger, Merleau-Ponty, Experience and Judgement

FIG. 19

| DATA NAME | KEYWORD |
|---|---|
| DATA 1 | Edmund Husserl, Ideen, phenomenology··· |
| DATA 2 | Wittgenstein, Tractatus, Language Game··· |
| DATA 3 | modern music, theremin, Schnittke··· |
| ⋮ | ⋮ |

FIG. 20

RECOMMENDED BACKNUMBER

DECEMBER ISSUE

CONTENTS:
    Life of Edmund Husserl
    Wittgenstein and Language

FEBRUARY ISSUE

CONTENTS:
    Idea of Phenomenology, and After That
    Life of Merleau-Ponty

JUNE ISSUE

CONTENTS:
    Wundt and Phenomenology
    Rethink of "Tractatus"

190
TABLE OF CONTENTS
190a 190b-1
HEADER INFORMATION
190b-2
TABLE OF CONTENTS
190b

TABLE OF CONTENTS

1. Music and Myself ——2
   Yasushi Sekine
2. Schnittke and Cadenza ——15
   Kouji Imada
3. Schubert and Schwint ——24
   Michiko Hatayama
4. Theremin and Modern Music ——51
   Kyosuke Kuroda
5. Melodies of Western Music and Gagaku ——74
   Ichiro Gonda 200a
200c
200b

210

Although it has not been popularized, the musical instrument, "theremin", which appeared in the 1920s has exerted a great influence on the development in modern music.
　　The historical background to the development of the theremin and an influence of the theremin on the present day will be explored below.

TABLE OF CONTENTS

1. Music and Myself ――2
   Yasushi Sekine
2. Schnittke and Cadenza ――15
   Koji Imada
3. Schubert and Schwint ――24
   Michiko Hatayama
4. Theremin and Modern Music ――51
   Kyosuke Kuroda
5. Melodies of Western Music and Gagaku ――74
   Ichiro Gonda — 200a
— 200c
— 200b

— 210

Although it has not been popularized, the musical instrument, "theremin", which appeared in the 1920s has exerted a great influence on the develo...

Regarding the theremin, an explanation is provided on page 52 of the text, and image data in the form of a two-dimensional code is attached on page 53.

APPARATUS FOR PROCESSING MACHINE-READABLE CODE PRINTED ON PRINT MEDIUM TOGETHER WITH HUMAN-READABLE INFORMATION

BACKGROUND OF THE INVENTION

1) Field of the Invention

The present invention relates to an information processing system which processes machine-readable code information printed on a print medium. The machine-readable code information is, for example, by a two-dimensional code.

2) Description of the Related Art

Recently, human-readable information is often provided together with machine-readable information, where the human-readable information and the machine-readable information are recorded in different information recording mediums. For example, a number of currently distributed magazines have an appendix in the form of a CD-ROM (compact disk read-only-memory). In such a CD-ROM, application programs, image data, and the like are recorded for improving the values of the magazines.

However, in many cases, relationship between the machine-readable information and the human-readable information which is provided together with the machine-readable information is not clear. Therefore, bothersome operations are required for referring to machine-readable information which corresponds to an item in the human-readable printed information In addition, the machine-readable information is independent of machine-readable information which is provided previously, or relationship between currently distributed machine-readable information and previously distributed machine-readable information is not clear. Therefore, it is not possible to effectively utilize the machine-readable information which is provided together with human-readable printed information.

SUMMARY OF THE INVENTION

An object of the present invention is to provide an information recording medium which facilitates reference to machine-readable information corresponding to human-readable printed information.

Another object of the present invention is to provide an information processing apparatus and an information processing system which facilitate reference to machine-readable information corresponding to human-readable printed information, and enable effective utilization of the machine-readable information.

(1) According to the first aspect of the present invention, there is provided a print medium on which human-readable information and machine-readable code information are printed, where the machine-readable code information is related to the human-readable information.

The print medium according to the first aspect of the present invention enables a user (reader of the human-readable information) to easily refer to additional information which is related to the human-readable information and included in the machine-readable code information.

The print medium according to the first aspect of the present invention may have one or any combination of the following additional features.

(i) The machine-readable code information may include processing control information which is usable for processing of information including the machine-readable code information.

(ii) The machine-readable code information may include processing control information which is usable for selecting one of at least one processing program for use in processing of information including the machine-readable code information.

(iii) The machine-readable code information may include index information as an index to information printed on the print medium.

(iv) The machine-readable code information may contain information including at least one keyword related to the information printed on the print medium.

(v) The machine-readable code information may be two-dimensional machine-readable code information.

(2) According to the second aspect of the present invention, there is provided an information processing apparatus which processes machine-readable code information which is printed, together with human-readable information, on a print medium. The information processing apparatus includes a decoding unit which receives and decodes the machine-readable code information to generate decoded information; an information storing unit which stores at least a portion of the decoded information as stored information; and a processing unit which determines a processing operation to be performed, based on the decoded information and the stored information, and performs the determined processing operation.

By using the information processing apparatus according to the second aspect of the present invention, the user can effectively utilize the machine-readable information together with human-readable information which is printed with the same print medium as the machine-readable information.

The information processing apparatus according to the second aspect of the present invention may have one or any combination of the following additional features.

(vi) The information processing apparatus according to the second aspect of the present invention may further comprise an extracting unit which extracts a portion of the machine-readable code information or the decoded information.

(vii) In addition to the above feature (vi), the portion of the machine-readable code information or the decoded information extracted by the extracting unit may be a portion which can be handled by the processing unit.

(viii) In addition to the above feature (vi), the extracting unit may extract the portion of the machine-readable code information or the decoded information, based on the stored information.

(ix) In addition to the above feature (vi), the extracting unit may extract the portion of the machine-readable code information or the decoded information, based on a result of a processing operation performed by the processing unit.

(x) In addition to the above feature (vi), the information processing apparatus according to the second aspect of the present invention may further comprise a processing program storing unit which stores at least one processing program. In this case, the processing unit may select, based on the portion extracted by the extracting unit, one of the at least one processing program for performing the processing operation.

(xi) In addition to the above features (vi) and (x), the extracting unit may extract the portion of the machine-readable code information or the decoded information, based on the at least one processing program stored in the processing program storing unit.

(xii) In addition to the above feature (vi), the information processing apparatus according to the second aspect of the present invention may further comprise an attribute storing unit which stores, as attribute information, information on at least one attribute of a system or at least one user. In this case, the extracting unit may extract the portion of the machine-readable code information or the decoded information, based on the attribute information stored in the attribute storing unit.

(xiii) The information processing apparatus according to the second aspect of the present invention may further comprise an attribute storing unit which stores, as attribute information, information on at least one attribute of a system or at least one user. In this case, the processing unit may determine the processing operation, based on the attribute information stored in the attribute storing unit.

(xiv) The machine-readable code information may include index information which includes a list of contents of information printed on the print medium, and the information processing apparatus may further comprise an index extracting unit which extracts, from the decoded information, decoded index information corresponding to the index information. In this case, the processing unit may determine the processing operation, based on the decoded index information extracted by the index extracting unit.

(xv) In addition to the above feature (xiv), the decoded index information may include at least one item, and the information processing apparatus may further comprise a display unit which displays information. In this case, the processing unit may refer to the stored information, select one of the at least one item based on the stored information, and control the display unit to display information corresponding to the selected one of the at least one item.

(xvi) In addition to the above features (xiv) and (xv), the information processing apparatus according to the second aspect of the present invention may further comprise a keyword storing unit which extracts, from the decoded information, at least one keyword related to the information printed on the print medium, and stores the at least one keyword. In this case, the processing unit may select one of the at least one item based on information stored in the keyword storing unit, and control the display unit to display information corresponding to the selected one of the at least one item.

(xvii) The machine-readable code information may be two-dimensional machine-readable code information.

(3) According to the third aspect of the present invention, there is provided a product for use with an information processing apparatus which processes machine-readable code information which is printed, together with human-readable information, on a print medium. The product, when used with the information processing apparatus, is able to output control information which directs the information processing apparatus to realize the information processing apparatus according to the second aspect of the present invention.

(4) According to the fourth aspect of the present invention, there is provided an information processing system which processes machine-readable code information which is printed, together with human-readable information, on a print medium. The information processing system includes a reading unit which reads the machine-readable code information; a decoding unit which decodes the machine-readable code information read by the reading unit, to generate decoded information; an information storing unit which stores at least a portion of the decoded information as stored information; a processing unit which determines a processing operation to be performed, based on the decoded information and the stored information, and performs the determined processing operation; and a machine-readable code information outputting unit which outputs machine-readable code information, together with human-readable information, to a print medium.

(5) According to the fifth aspect of the present invention, there is provided an information outputting apparatus which includes a human-readable information generating unit which generates human-readable information; a machine-readable code information generating unit which generates machine-readable code information which is related to the human-readable information; and an information outputting unit which outputs the machine-readable code information together with the human-readable information, for printing the machine-readable code information together and the human-readable information on a print medium.

The information outputting apparatus according to the fifth aspect of the present invention can produce a print medium according to the first aspect of the present invention.

The information outputting apparatus according to the fifth aspect of the present invention may have one or any combination of the following additional features.

(xviii) The machine-readable code information may include processing control information which is usable for processing of information including the machine-readable code information.

(xix) The machine-readable code information may include processing control information which is usable for selecting one of at least one processing program for use in processing of information including the machine-readable code information.

(xx) The machine-readable code information may include index information as an index to information printed on the print medium.

(xxi) The machine-readable code information may contain information including at least one keyword related to the information printed on the print medium.

(xxii) The machine-readable code information may be two-dimensional machine-readable code information.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 13 is a diagram illustrating an example of an image displayed by the CRT monitor as a result of the operation of FIG. 11;

FIG. 15 is a diagram illustrating the fourth example of information printed on a print medium;

FIG. 19 is a diagram illustrating an example of a keyword table produced in the operation of FIG. 17;

FIG. 20 is a diagram illustrating an example of an index table produced in the operation of FIG. 17;

FIG. 25 is a diagram illustrating the seventh example of information printed on a print medium;

FIG. 27 is a diagram illustrating an example of a window 210 displayed by the CRT monitor when the item "Theremin and Modern Music—51" is selected in the window image 200 in FIG. 26;

FIG. 28 is a diagram illustrating an example of a window 215 displayed by the CRT monitor when the item "theremin" is selected in the window 210 in FIG. 27;

DESCRIPTION OF THE PREFERRED EMBODIMENTS

Embodiments of the present invention are explained in detail below with reference to drawings.

(1) Functions of Information Processing System

Figure 1:
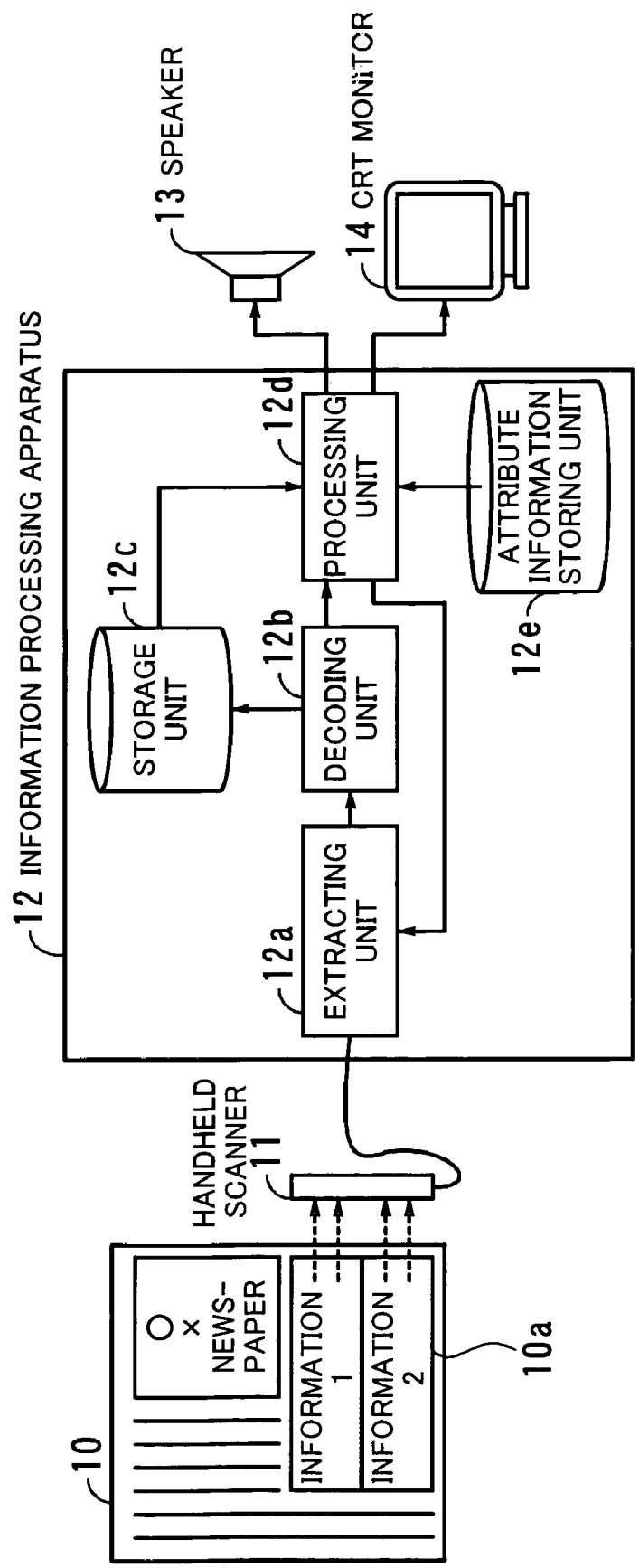
FIG. 1 is a diagram illustrating basic construction of the information processing system according to the present invention.

FIG. 1 is a diagram illustrating basic construction of the information processing system according to the present invention. In the construction of FIG. 1, 10 denotes a print medium, 10a denotes machine-readable code information, 11 denotes a scanner, 12 denotes an information processing apparatus, 13 denotes a speaker, and 14 denotes a CRT monitor. In the information processing apparatus 12, 12a denotes an extracting unit, 12b denotes a decoding unit, 12c denotes a storage unit, 12d denotes a processing unit, and 12e denotes an attribute information storing unit.

The print medium 10 is, for example, a sheet of paper. On the print medium 10, the machine-readable code information 10a is printed in addition to human-readable information. The human-readable information includes, for example, characters and images, and the machine-readable code information 10a is, for example, an optically readable two-dimensional code 10a.

Figure 2:
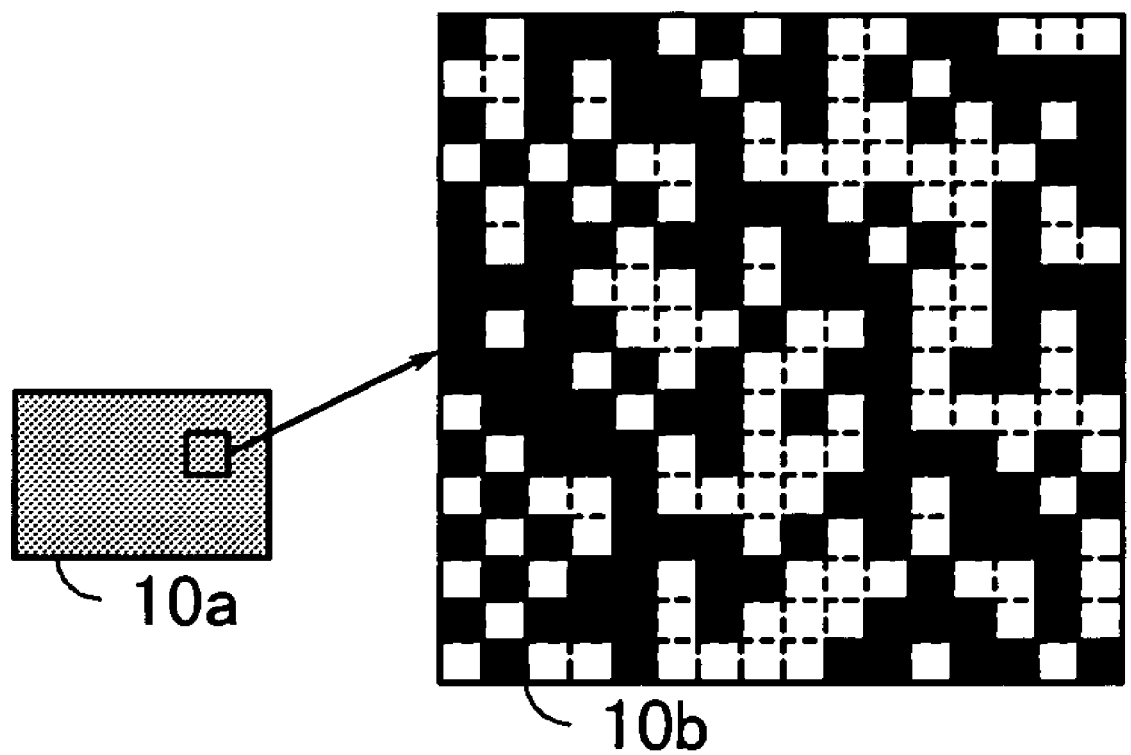
FIG. 2 is a diagram illustrating a two-dimensional code as an example of machine-readable code information.

FIG. 2 shows a magnified image 10b of a portion of the machine-readable code information 10a. In this example, the machine-readable code information 10a is a two-dimensional code. As illustrated in FIG. 2, the two-dimensional code 10b is comprised of two-dimensionally arrayed dots which are generated by conversion of digital data. The two-dimensional code 10a as illustrated in FIG. 2 can be printed on the print medium, together with the human-readable information.

The scanner 11 may be a handheld scanner, which optically reads the two-dimensional code 10a, and performs predetermined processing on the optically read data to generate image data (bit pattern) representing the two-dimensional code 10a, which is then supplied to the information processing apparatus.

In the information processing apparatus 12, the extracting unit 12a extracts a portion of information supplied from the scanner 11. The decoding unit 12b performs a decoding operation on the portion of information extracted by the extracting unit 12a to regenerate original information represented by the two-dimensional code 10a. The storage unit 12c stores at least a portion of the regenerated (decoded) information. The processing unit 12d executes processing which is determined based on the information stored in the storage unit 12c, the information decoded by the decoding unit 12b, and attribute information stored in the attribute information storing unit 12e. The attribute information storing unit 12e stores, for example, personal information on users, information on the system construction, and the like.

The speaker 13 outputs sound represented by a sound signal output from the processing unit 12d, and the CRT monitor 14 displays an image represented by an image signal output from the processing unit 12d.

The operations of the construction of FIG. 1 are explained below.

When a user scans the two-dimensional code 10a printed on the paper (as the print medium 10) by using the handheld scanner 11, the image data representing the two-dimensional code 10a is generated by the handheld scanner 11, and supplied to the information processing apparatus 12. The extracting unit 12a extracts a portion, corresponding to the two-dimensional code 10a, of the image data supplied from the handheld scanner 11, and supplies the extracted portion of the image data to the decoding unit 12b.

When the two-dimensional code 10a includes data indicating a type of information included in the two-dimensional code 10a and an area in which the information is recorded, for example, in the form of header information, the extracting unit 12a may first extract an area, corresponding to the header information, of the two-dimensional code 10a, and supplies the extracted area of the image data to the decoding unit 12b. In this case, the header information regenerated by the decoding unit 12b is supplied to the processing unit 12d, and the processing unit 12d can instruct the extracting unit 12a to extract only a necessary area of the image data, based on the header information.

The decoding unit 12b decodes the extracted portion of the image data (bit pattern) to regenerate the original information represented by the extracted portion of the two-dimensional code 10a. The original information includes, for example, text information, image information, sound information, and the like. The storage unit 12c stores a necessary portion of the decoded information. The processing unit 12d executes processing which is determined based on the information stored in the storage unit 12c, the information decoded by the decoding unit 12b, and the attribute information stored in the attribute information storing unit 12e. For example, the processing unit 12d refers to the attribute information storing unit 12e, and determines an item of information (e.g., information item 1) which is estimated to be an item of interest to the user. The processing unit 12d makes the CRT monitor 14 display the determined item of information.

When the information items 1 and 2 included in the two-dimensional code 10a are sound information and text information, respectively, and the processing unit 12d recognizes, based on the information stored in the attribute information storing unit 12e, that the user is visually handicapped, the processing unit 12d selects the sound information (the information item 1), and supplies the sound information to the speaker 13.

In addition, it is possible to read out from the storage unit 12c an item of information read from a previously-read print medium when necessary, so that the processing unit 12d performs processing based on both the information read from the previously-read print medium and information read from the currently scanned print medium. For example, when reference to information read from a previously read print medium is necessary, it is possible to retrieve the necessary information from the storage unit 12c and display the information by the CRT monitor 14.

By using the print medium and the information processing apparatus according to the present invention, the user can refer to both the human-readable information and the machine-readable code information, based on recognition of linkage therebetween.

In addition, it is possible to systematically combine and utilize information read from a previously read print medium and information read from a currently scanned print medium. Therefore, it is possible to further improve the value of the information.

(2) Hardware Construction of Information Processing System

Figure 3:
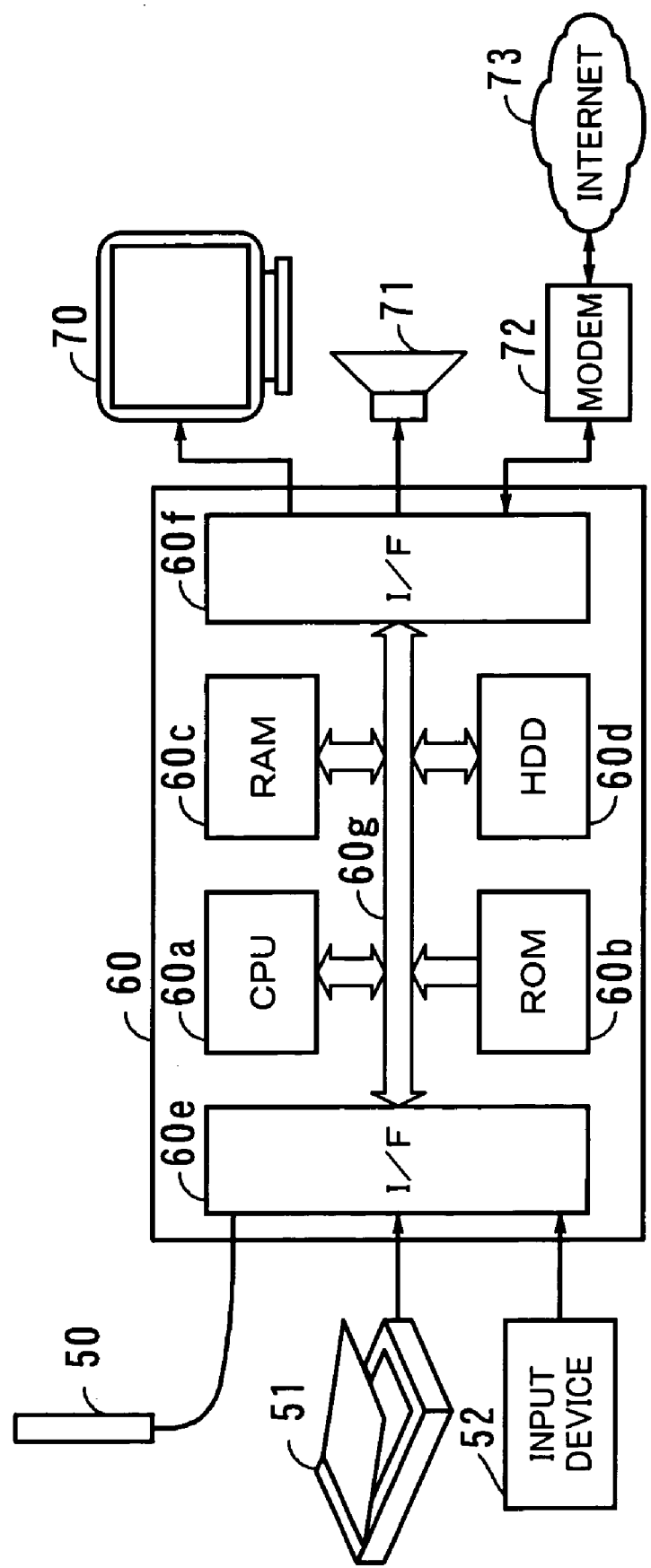
FIG. 3 is a diagram illustrating the hardware construction of the information processing apparatus as an embodiment of the present invention.

FIG. 3 is a diagram illustrating the hardware construction of the information processing system as an embodiment of the present invention. In FIG. 3, reference numeral 50 denotes a handheld scanner, 51 denotes a flat-bed scanner, 52 denotes an input device, 60 denotes the information processing apparatus, 70 denotes a CRT monitor, 71 denotes a speaker, 72 denotes a modem, and 73 denotes the Internet.

The handheld scanner 50 optically reads the two-dimensional code 10a printed on the print medium, performs predetermined processing on the optically read data to generate image data (bit pattern) representing the two-dimensional code 10a, and supplies the image data to the information processing apparatus 60. The flat-bed scanner 51 also optically reads the two-dimensional code 10a printed on the print medium which is placed on a glass table of the flat-bed scanner 51, by moving a reading head, performs predetermined processing on the optically read data to generate image data (bit pattern) representing the two-dimensional code 10a, and supplies the image data to the information processing apparatus 60. In addition, it is possible to read the two-dimensional code 10a printed on the print medium, by using other devices such as a digital camera.

The input device 52 supplies instructions of the user to the information processing apparatus 60, and is comprised of, for example, a keyboard and a mouse. The information processing apparatus 60 executes processing based on the image data of the two-dimensional code 10a supplied from the handheld scanner 50 or the flat-bed scanner 51, and the instructions from the input device 52.

The information processing apparatus 60 includes a central processing unit (CPU) 60a, a read-only memory (ROM) 60b, a random access memories (RAM) 60c, a hard disk drive (HDD) 60d, interfaces (I/F) 60e and 60f, and a bus 60g. The CPU 60a, the ROM 60b, the RAM 60c, the hard disk drive (HDD) 60d, and the interfaces (I/F) 60e and 60f are connected with the bus 60g so that data can be transferred between the respective constituents of the information processing apparatus 60.

The CPU 60a executes processing based on the image data of the two-dimensional code 10a supplied from the handheld scanner 50 or the flat-bed scanner 51, and the instructions from the input device 52. The read-only memory (ROM) 60b stores a basic program such as an initial program loader (IPL) and basic data. The RAM 60c temporarily stores a program currently executed by the CPU 60a and various data currently handled by the CPU 60a. The hard disk drive (HDD) 60d stores application programs to be executed by the CPU 60a, various data such as system information, and the information read by the handheld scanner 50 or the flat-bed scanner 51.

The CRT monitor 70 displays an image represented by an image signal supplied from the information processing apparatus 60, and the speaker 71 outputs sound represented by a sound signal supplied from the information processing apparatus 60. The modem 72 is provided for transmitting to and receiving from a server or a terminal (not shown) information through the Internet. The interface (I/F) 60e transforms the information from the handheld scanner 50, the flat-bed scanner 51, and the input device 52, into a form which can be handled in the information processing apparatus 60. The interface (I/F) 60f transforms data forms of the image signals and the sound signals generated in the information processing apparatus 60 when the image signals and the sound signals are supplied from the information processing apparatus 60 to the CRT monitor 70 and the speaker 71, respectively.

(3) First Operation

Figure 4:
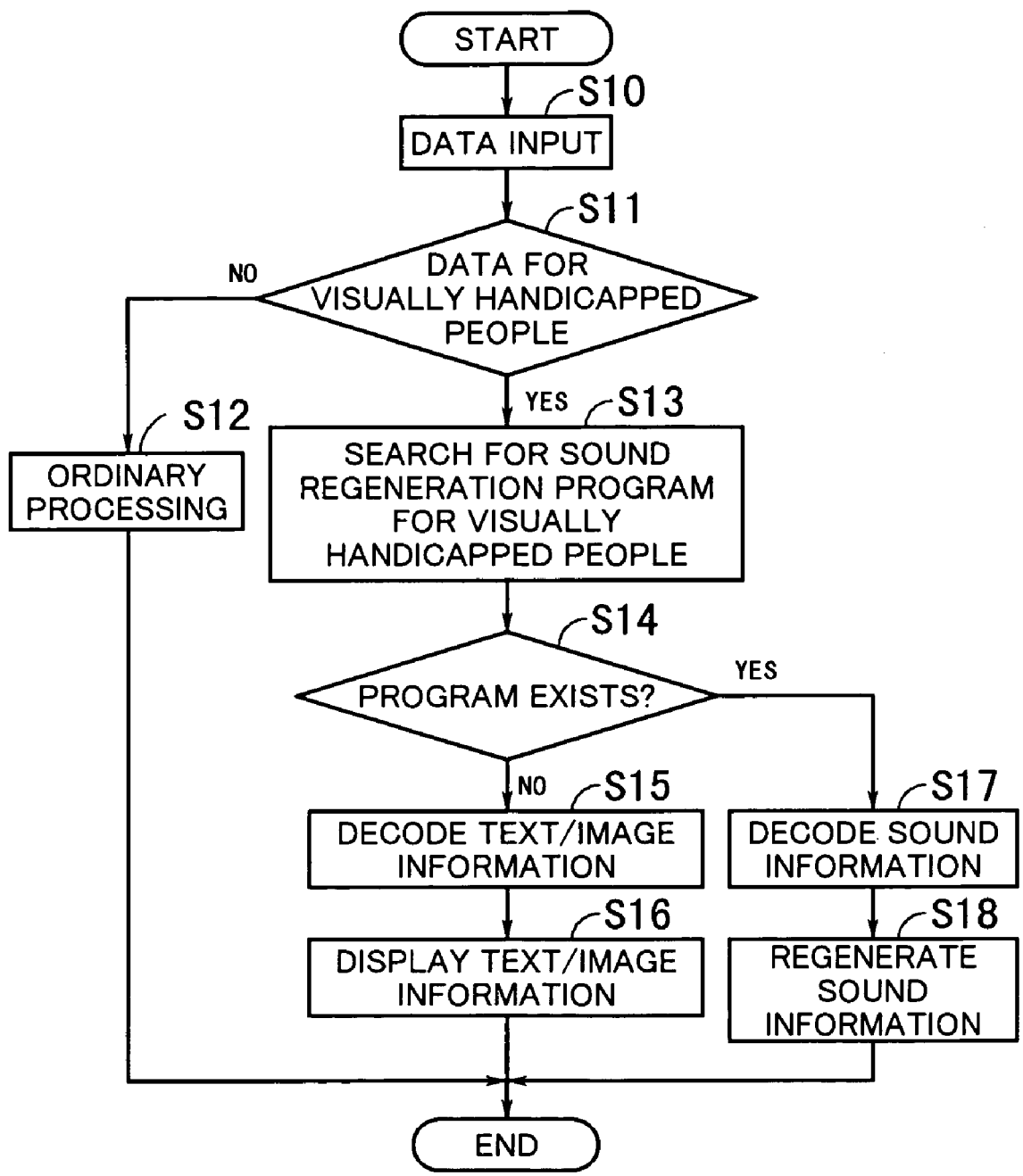
FIG. 4 is a flowchart illustrating an example of the first operation performed in the information processing system of FIG. 3.

FIG. 4 is a flowchart illustrating an example of the first operation performed in the information processing system of FIG. 3. The operation of FIG. 4 is performed when the user of the information processing apparatus 60 may be a visually-handicapped person, and the two-dimensional code printed on the print medium includes text information and sound information which is provided for visually-handicapped people. The operation of FIG. 4 is started when the user scans the two-dimensional code 80c printed on the print medium 80 as illustrated in FIG. 5, by using the handheld scanner 50 or the flat-bed scanner 51.

Figure 5:
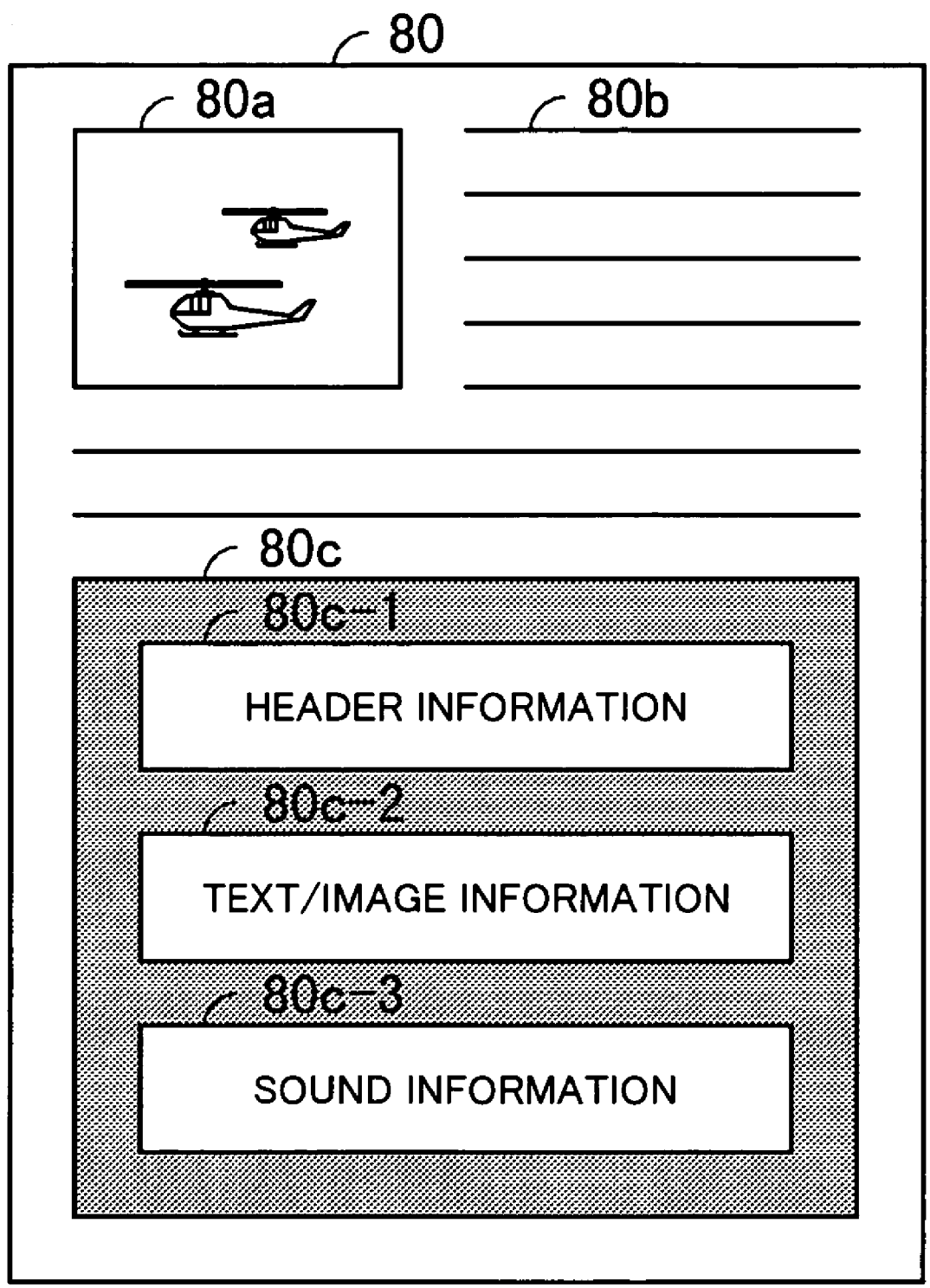
FIG. 5 is a diagram illustrating the first example of information printed on a print medium.

FIG. 5 is a diagram illustrating the first example of information printed on a print medium. Human-readable information and a two-dimensional code 80c are printed on the print medium 80 of FIG. 5, where the human-readable information includes image information 80a and text information 80b, and the two-dimensional code 80c includes header information 80c-1, text/image information 80c-2, and sound information 80c-3.

Figure 6:
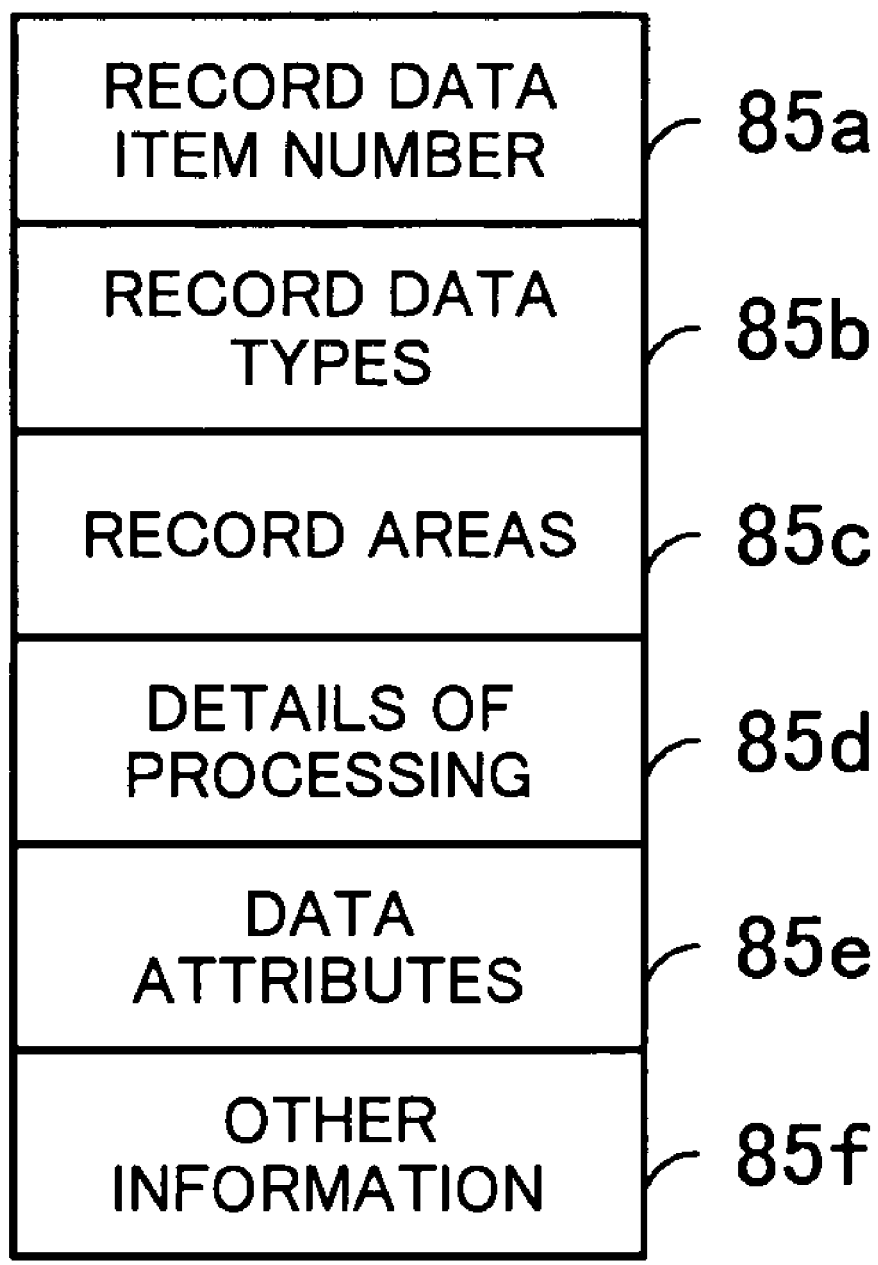
FIG. 6 is a diagram illustrating an example of header information in the machine-readable code information of FIG. 5.

The header information 80c-1 indicates the type of the information included in the two-dimensional code 80c, and the like. FIG. 6 is a diagram illustrating an example of header information 80c-1 in the two-dimensional code 80c of FIG. 5. The header information 80c-1 in this example includes the fields of "record data item number" 85a, "record data types" 85b, "record areas" 85c, "details of processing" 85d, "data attributes" 85e, and "other information" 85f.

The field "record data item number" 85a indicates the number of record data items included in the two-dimensional code 80c. Since only two data items, the text/image information 80c-2 and the sound information 80c-3, are included in this example, the record data item number 85a is two.

The field "record data types" 85b indicates the types of the record data items included in the two-dimensional code 80c. In this example, the field "record data types" 85b indicates "text/image and sound".

The field "record areas" 85c contains coordinates of areas in which the respective record data items are printed on the print medium. In this example, the field "record areas" 85c contains the coordinates of the areas in which the text/image information 80c-2 and the sound information 80c-3 are printed. The coordinates of areas in which the respective record data items are printed are used by the information processing apparatus 60 when the information processing apparatus 60 extracts a desired portion of the image data of the two-dimensional code 80c so that only the desired portion of the two-dimensional code 80c is decoded. Thus, the time required for the decoding operation can be reduced.

The field "details of processing" 85d contains data indicating the contents of the processing to be performed on the respective information items. For example, the data contained in the field "details of processing" 85d indicates "the decoding operation in accordance with JPEG (Joint Photographic Experts Group)" for the text/image information 80c-2, and "the decoding operation in accordance with MP3 (MPEG Audio layer 3)" for the sound information 80c-3.

The field "data attributes" 85e contains data indicating the attribute of the data included in the two-dimensional code 80c. For example, in the example of FIG. 5, the data contained in the field "data attributes" 85e indicates "data provided for visually-handicapped people".

The field "other information" 85f contains information other than described above. In the following explanation of the first operation, the user of the information processing apparatus 60 is assumed to be a visually-handicapped person.

The example of the first operation is explained below with reference to FIG. 4.

In step S10, when the user scans the two-dimensional code 80c printed on the print medium 80 as illustrated in FIG. 5, by using the handheld scanner 50 or the flat-bed scanner 51, the image data of the two-dimensional code 80c is input into the information processing apparatus 60. That is, the CPU 60a acquires the image data output from the handheld scanner 50 or the flat-bed scanner 51, and temporarily stores the image data in the RAM 60c.

In step S11, the CPU 60a extracts, from the image data temporarily stored in the RAM 60c, a portion of the image data corresponding to the header information 80c-1, and decodes the extracted portion to regenerate the header information 80c-1. Then, the CPU 60a refers to the field "data attributes" 85e (in the header information 80c-1 as illustrated in FIG. 6) to determine whether or not the image data is provided for visually-handicapped people. When yes is determined, the operation goes to step S13, and when no is determined, the operation goes to step S12. Since, in this example, the image data of FIG. 5 is provided for visually-handicapped people, the operation goes to step S13.

In step S12, the CPU 60a executes processing which should be executed when the image data is not provided for visually-handicapped people. That is, the CPU 60a decodes the two-dimensional code 80c to regenerate the original information represented by the image data, and supplies the regenerated information, for example, to the CRT monitor 70 and the like.

In step S13, the CPU 60a searches for a sound regeneration program provided for visually-handicapped people in the hard disk 60d. That is, in step S14, it is determined whether or not the sound regeneration program provided for visually-handicapped people is stored in the hard disk 60d. When yes is determined, the operation goes to step S17, and when no is determined, the operation goes to step S15. Alternatively, in step S14, the CPU 60a may refer to users information which is stored in the hard disk 60d to determine whether or not the user is a visually-handicapped person.

In step S15, the CPU 60a refers to the field "record areas" 85c (in the header information 80c-1 as illustrated in FIG. 6) to obtain information on the area of the text/image information 80c-2 in the two-dimensional code 80c. Then, the CPU 60a cuts out a portion of the image data corresponding to the text/image information 80c-2 based on the above information on the area, and decodes the cut-out portion of the image data to regenerate the text/image information 80c-2.

Figure 7:
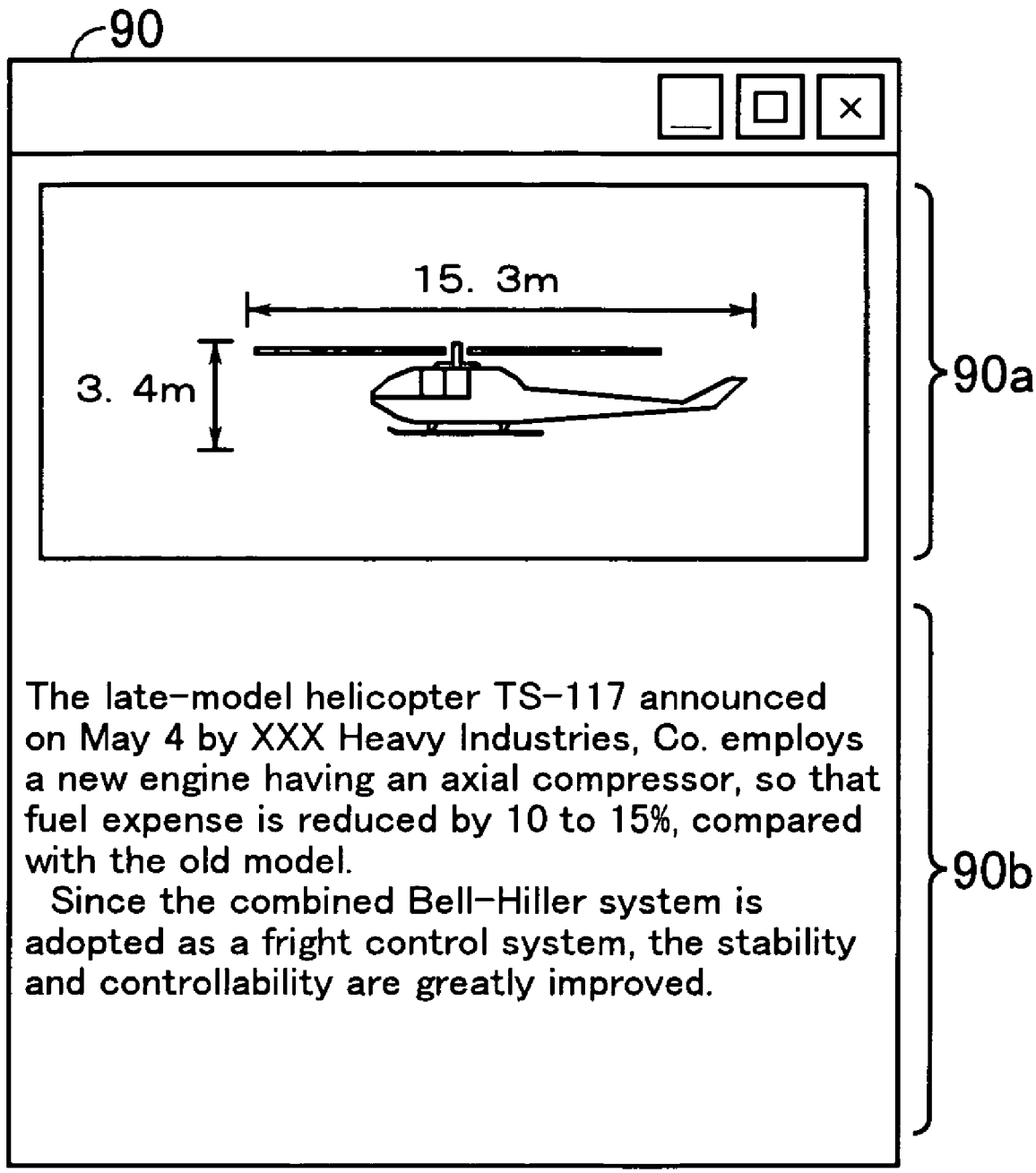
FIG. 7 is a diagram illustrating an example of an image displayed by the CRT monitor as a result of the operation of FIG. 4.

In step S16, the CPU 60a supplies the regenerated text/image information 80c-2, and makes the CRT monitor 70 display the regenerated text/image information 80c-2. FIG. 7 is a diagram illustrating an example of an image displayed by the CRT monitor 70 as a result of the operation of FIG. 4. In this example, the window 90 including the image 90a and the text 90b is displayed. The displayed image 90a and text 90b are provided as a supplement to or details of the aforementioned human-readable information. In the example of FIG. 7, the image 90a shows a further detail of the human-readable image 80a of the helicopters in FIG. 5, and the text 90b provides an explanation of the detailed image 90a.

In step S17, the CPU 60a decodes the sound information 80c-3. That is, the CPU 60a refers to the field "record areas" 85c (in the header information 80c-1 as illustrated in FIG. 6) to obtain information on the area of the sound information 80c-3 in the two-dimensional code 80c. Then, the CPU 60a cuts out a portion of the image data corresponding to the sound information 80c-3 based on the above information on the area, and decodes the cutout portion of the image data to regenerate the sound information 80c-3.

In step S18, the CPU 60a supplies the decoded sound information 80c-3 to the speaker 71 so that the above text 90b is read out by the speaker 71.

Although, in the example of FIG. 5, the area of the header information 80c-1 provided in the two-dimensional code 80c is common to all the information items (the text/image information 80c-2 and the sound information 80c-3) in the two-dimensional code 80c, an area of header information may be separately provided for each information item, for example, at the leading portion of the area of each information item in the two-dimensional code 80c.

As described above, in the first operation, an appropriate portion of the two-dimensional code 80c is extracted and regenerated according to whether or not the user is a visually-handicapped person. Generally, it is possible to select an appropriate portion of machine-readable code information for each user, and regenerate the selected portion.

(4) Second Operation

Figure 8:
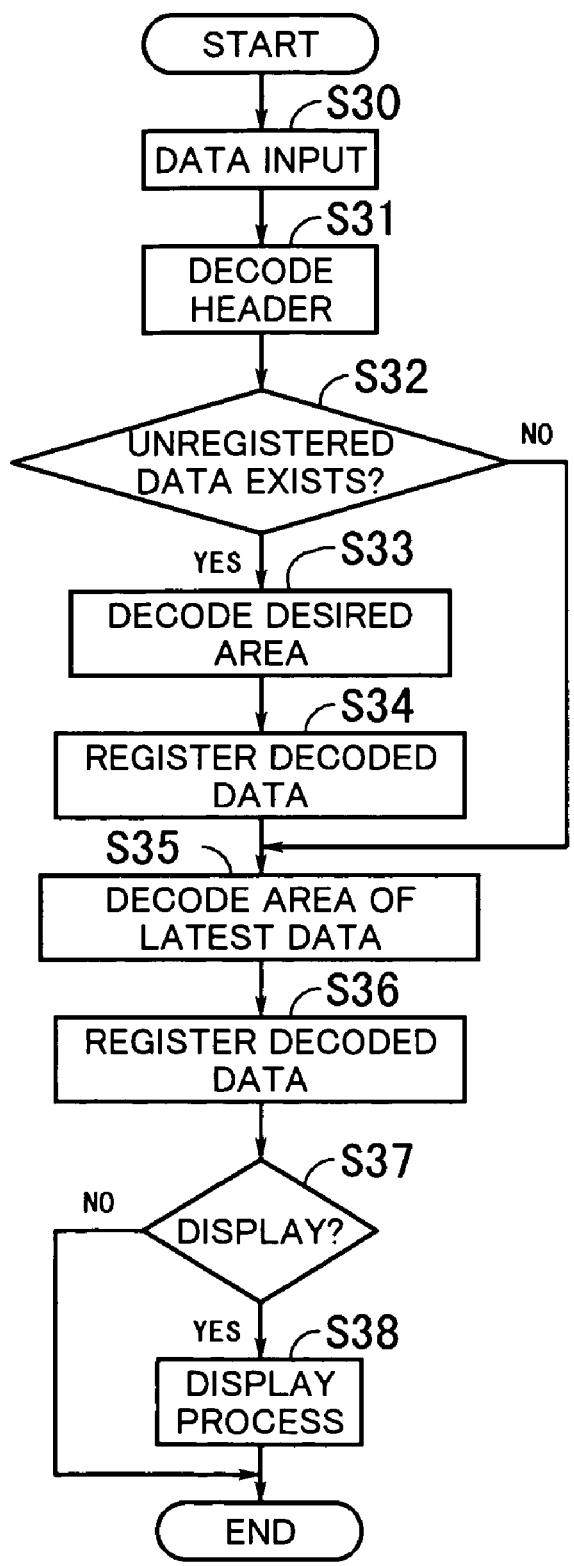
FIG. 8 is a flowchart illustrating an example of the second operation performed in the information processing system of FIG. 3.

FIG. 8 is a flowchart illustrating an example of the second operation performed in the information processing system of FIG. 3. In the second operation, the information processing apparatus acquires a portion of machine-readable code information printed on a print medium, based on contents of information currently stored in the information processing apparatus. The operation of FIG. 8 is started when the user scans the two-dimensional code 100b printed on the print medium 100 as illustrated in FIG. 9, by using the handheld scanner 50 or the flat-bed scanner 51.

Figure 9:
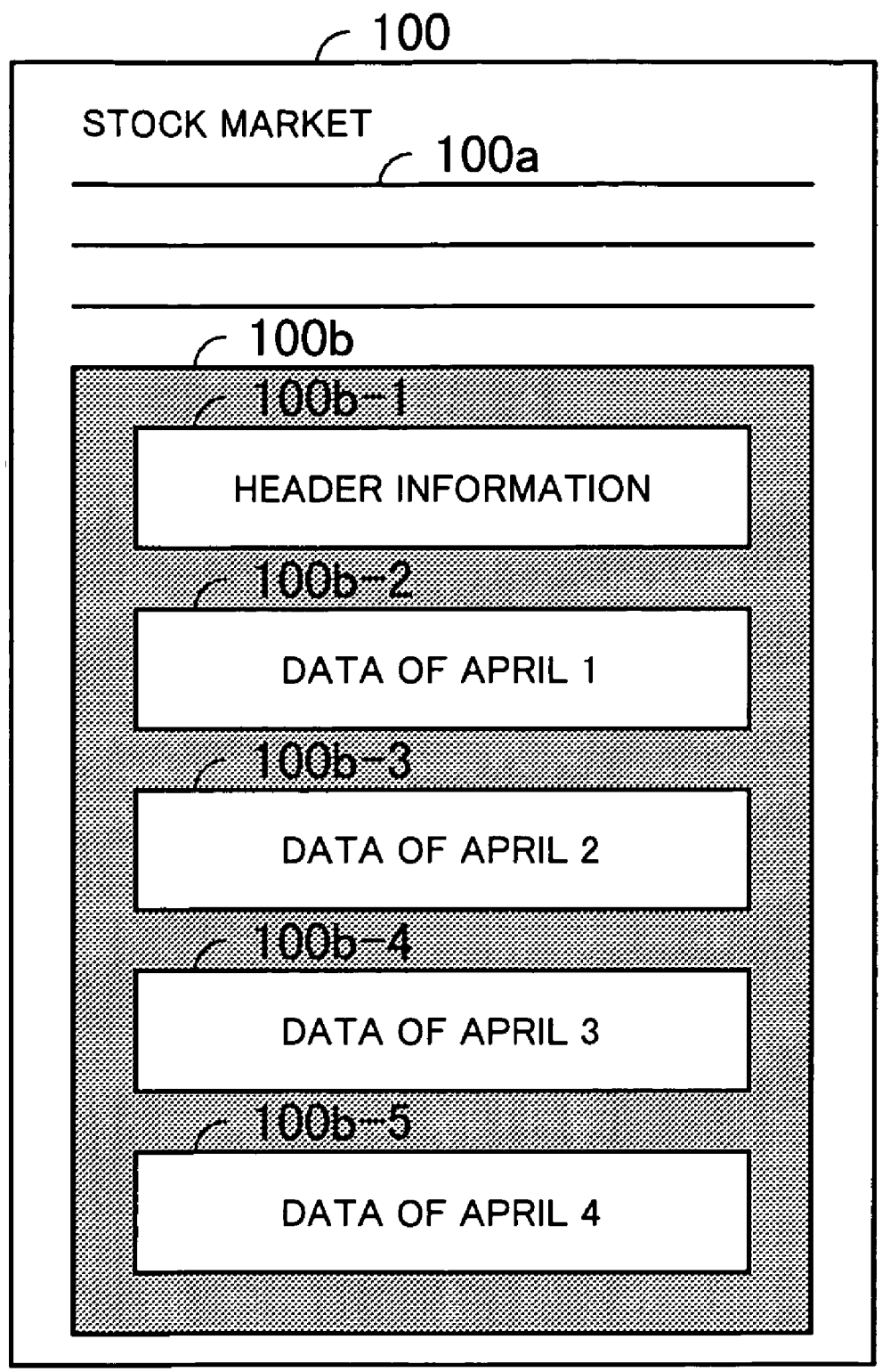
FIG. 9 is a diagram illustrating the second example of information printed on a print medium.

FIG. 9 is a diagram illustrating the second example of information printed on a print medium. In the example of FIG. 9, the print medium 100 is, for example, newspaper. Human-readable text information 100a on a stock market and a two-dimensional code 100b are printed on the print medium 100 of FIG. 9, where the two-dimensional code 100b includes header information 100b-1 and stock price data 100b-2, 100b-3, 100b-4, and 100b-5 for the last four days, so that any portion of the stock price data for the last four days can be acquired even if that portion has not been stored in the information processing apparatus 60. In the example of FIG. 9, the stock price data for four days to April 4 are included in the two-dimensional code 100b.

The example of the second operation is explained below with reference to FIG. 8. In the following explanation, it is assumed that the stock price data of April 2 and 3 are not stored in the information processing apparatus 60 before performing the operation of FIG. 9.

In step S30, when the user scans the two-dimensional code 100b printed on the print medium 100 as illustrated in FIG. 9, by using the handheld scanner 50 or the flat-bed scanner 51, the image data of the two-dimensional code 100b is input into the information processing apparatus 60. That is, the CPU 60a acquires the image data output from the handheld scanner 50 or the flat-bed scanner 51, and temporarily stores the image data, for example, in the RAM 60c.

In step S31, the CPU 60a extracts, from the image data temporarily stored in the RAM 60c, a portion of the image data corresponding to the header information 100b-1, and decodes the extracted portion to regenerate the header information 100b-1.

In step S32, the CPU 60a refers to the decoded header information 100b-1 and data stored in the hard disk 60d to determine whether or not the above image data of the two-dimensional code 100b includes data which has not yet been stored in hard disk 60d, i.e., whether or not the two-dimensional code 100b includes data which is unregistered in the information processing apparatus 60. When yes is determined, the operation goes to step S33, and when no is determined, the operation goes to step S35. Since the stock price data of April 2 and 3 are not stored in the information processing apparatus 60, the operation goes to step S33.

In step S33, the CPU 60a extracts a portion, corresponding to the stock price data of April 2 and 3, of the above image data stored temporarily stored in the RAM 60c, and decodes the extracted image data. That is, the CPU 60a refers to the header information 100b-1 to obtain information on the area of the stock price data of April 2 and 3 in the two-dimensional code 100b. Then, the CPU 60a extracts a portion of the image data corresponding to the stock price data of April 2 and 3 based on the above information on the area, and decodes the extracted portion of the image data to regenerate the stock price data of April 2 and 3.

In step S34, the CPU 60a registers (stores) the regenerated stock price data of April 2 and 3 in the hard disk 60d.

In step S35, the CPU. 60a extracts a portion of the image data corresponding to the latest data, from the image data temporarily stored in the RAM 60c, and decodes the extracted portion of the image data to regenerate the latest data.

In step S36, the CPU 60a registers (stores) the regenerated data in the hard disk 60d.

In step S37, the CPU 60a determines whether or not all of the data stored in the hard disk 60d should be displayed. When yes is determined, the operation goes to step S38, and when no is determined, the operation of FIG. 8 is completed.

In step S38, the CPU 60a executes predetermined processing of the data stored in the hard disk 60d, and supplies the processed data to the CRT monitor 70 to display the processed data.

Figure 10:
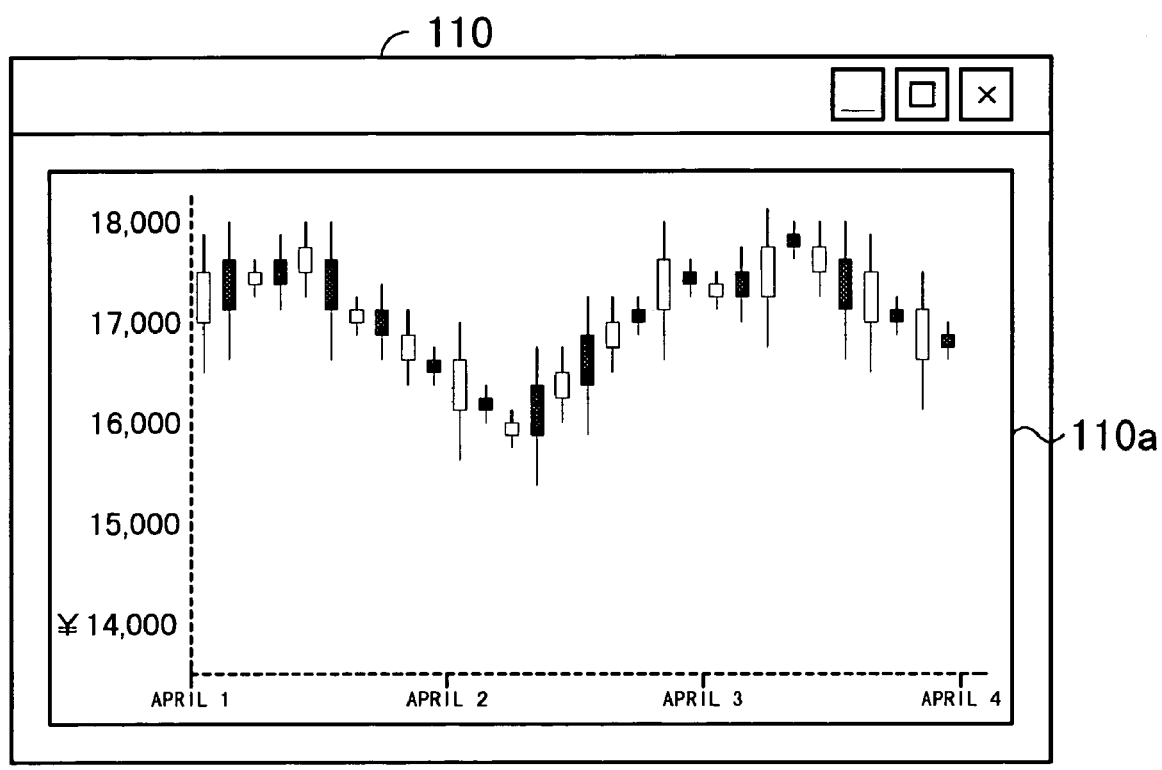
FIG. 10 is a diagram illustrating an example of an image displayed by the CRT monitor as a result of the operation of FIG. 8.

FIG. 10 is a diagram illustrating an example of an image displayed by the CRT monitor 70 as a result of the operation of FIG. 8. In this example, the window 110 including a graph 110a is displayed, where the graph 110a indicates movement of the stock price. Although the stock price data of April 2 and 3 are not stored in the information processing apparatus 60 before the above operation of FIG. 8 is performed, the stock price data of April 2 and 3 are acquired by the operation of FIG. 8, and displayed together with the stock price data of the other data as illustrated in FIG. 10.

As described above, according to the second operation, the information processing apparatus can automatically determine and acquire a needed portion of information, among information included in machine-readable code information printed on a print medium which is currently scanned. Therefore, the information processing apparatus can collect necessary information without omission.

(5) Third Operation

Figure 11:
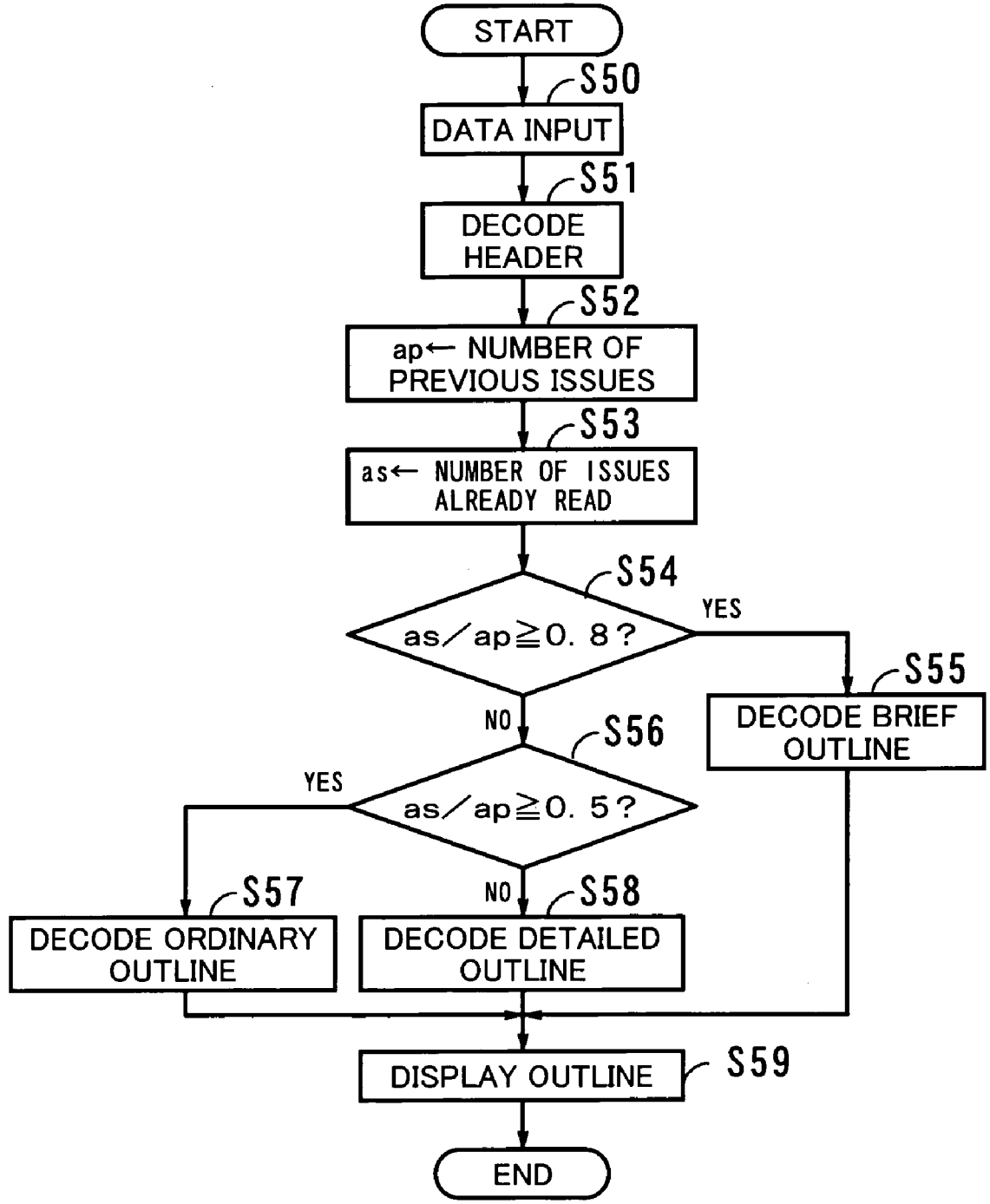
FIG. 11 is a flowchart illustrating an example of the third operation performed in the information processing system of FIG. 3.

FIG. 11 is a flowchart illustrating an example of the third operation performed in the information processing system of FIG. 3. In the operation of FIG. 11, one of a brief, ordinary, and detailed outlines of a previously-issued portion of a serialized novel appearing in a periodical is selectively displayed according to the frequency of reading of the periodical by the user. The operation of FIG. 11 is started when the user scans the two-dimensional code 120b printed on the print medium 120 of the periodical as illustrated in FIG. 12, by using the handheld scanner 50 or the flat-bed scanner 51.

Figure 12:
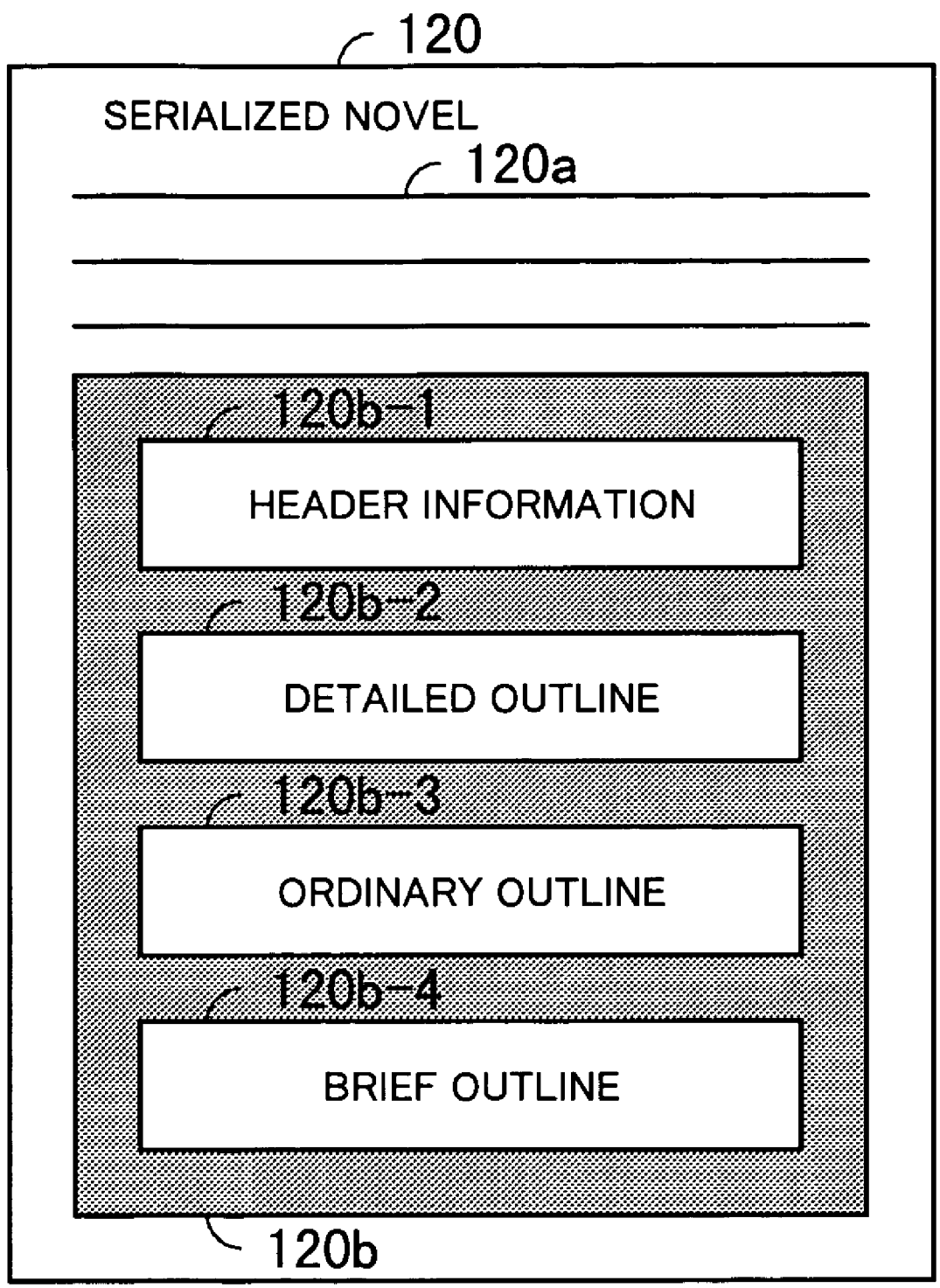
FIG. 12 is a diagram illustrating the third example of information printed on a print medium.

FIG. 12 is a diagram illustrating the third example of information printed on a print medium, which is an issue of the above periodical. On the print medium 120 of FIG. 12, a text 120a of the current-issue portion of the serialized novel and a two-dimensional code 120b are printed, where the two-dimensional code 120b includes the detailed, ordinary, and brief outlines 120b-2, 120b-3, and 120b-4 of the previously-issued portion of the serialized novel.

The example of the third operation is explained below with reference to FIG. 11.

In step S50, when the user scans the two-dimensional code 120b printed on the print medium 120 as illustrated in FIG. 12, by using the handheld scanner 50 or the flat-bed scanner 51, the image data of the two-dimensional code 120b is input into the information processing apparatus 60. That is, the CPU 60a acquires the image data output from the handheld scanner 50 or the flat-bed scanner 51, and temporarily stores the image data, for example, in the RAM 60c.

In step S51, the CPU 60a extracts, from the image data temporarily stored in the RAM 60c, a portion of the image data corresponding to the header information 120b-1, and decodes the extracted portion to regenerate the header information 120b-1.

In step S52, the CPU 60a refers to the field "other information" 85f (as illustrated in FIG. 6) in the decoded header information 120b-1. In this example, the field "other information" 85f includes information on the number of the previous issues of the periodical. The CPU 60a acquires the number, and substitutes the number for a variable "ap". For example, the number of the previous issues of the periodical is "10".

In step S53, the CPU 60a refers to data stored in the hard disk 60d to obtain the number of issues of the periodical which the user has already read. Then, the CPU 60a substitutes the number for a variable "as". For example, the number of the issues of the periodical which the user has already read is "9".

In step S54, the CPU 60a determines whether or not the ratio as/ap is equal to or greater than 0.8. When yes is determined, the operation goes to step S55, and when no is determined, the operation goes to step S56.

In step S55, the CPU 60a refers to the field "record areas" 85c (as illustrated in FIG. 6) in the decoded header information 120b-1 to obtain information on the area of the brief outline 120b-4 of the previously-issued portion of the serialized novel. Then, the CPU 60a acquires a portion of the image data in the area of the brief outline 120b-4, from the image data temporarily stored in the RAM 60c, and decodes the acquired portion of the image data to regenerated brief outline 120b-4.

In step S56, the CPU 60a determines whether or not the ratio as/ap is equal to or greater than 0.5. When yes is determined, the operation goes to step S57, and when no is determined, the operation goes to step S58.

In step S57, the CPU 60a refers to the field "record areas" 85c in the decoded header information 120b-1 to obtain information on the area of the ordinary outline 120b-3 of the previously-issued portion of the serialized novel. Then, the CPU 60a acquires a portion of the image data in the area of the ordinary outline 120b-3, from the image data temporarily stored in the RAM 60c, and decodes the acquired portion of the image data to regenerate the ordinary outline 120b-3.

In step S58, the CPU 60a refers to the field "record areas" 85c in the decoded header information 120b-1 to obtain information on the area of the detailed outline 120b-2 of the previously-issued portion of the serialized novel. Then, the CPU 60a acquires a portion of the image data in the area of the detailed outline 120b-2, from the image data temporarily stored in the RAM 60c, and decodes the acquired portion of the image data to regenerate the detailed outline 120b-2.

In step S59, the CPU 60a supplies the regenerated image data including the outline to the CRT monitor 70 to display the regenerated image data including the outline.

When the number of the previous issues of the periodical is "10", and the number of the issues of the periodical which the user has already read is "9", as/ap=0.9. Therefore, the operation goes to step S55 to select the brief outline. FIG. 13 is a diagram illustrating an example of an image displayed by the CRT monitor as a result of the operation of FIG. 11. In the image displayed in the example of FIG. 13, the window 130 shows an example of a brief outline of the first to tenth episodes of a serialized novel, "Houkyoujin no Shi".

As described above, in the third operation, optimum information is automatically displayed for the user according to the situation of the user, e.g., the frequency of reading of the periodical by the user.

(6) Fourth Operation

Figure 14:
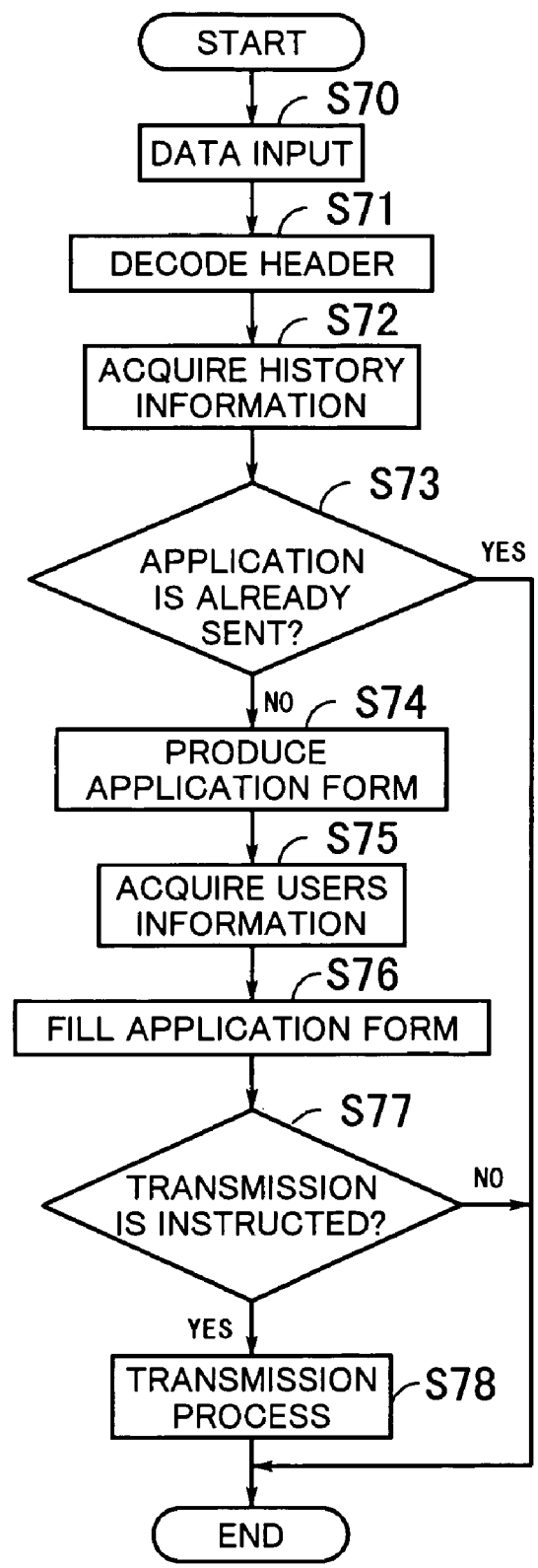
FIG. 14 is a flowchart illustrating an example of the fourth operation performed in the information processing system of FIG. 3.

FIG. 14 is a flowchart illustrating an example of the fourth operation performed in the information processing system of FIG. 3. The operation of FIG. 14 automatically makes preparation for transmission of an electronic mail for applying for a competition when an invitation to apply for the competition is included in a two-dimensional code printed on a print medium. The operation of FIG. 14 is started when the user scans the two-dimensional code 140b printed on the print medium 140 as illustrated in FIG. 15, by using the handheld scanner 50 or the flat-bed scanner 51.

FIG. 15 is a diagram illustrating the fourth example of information printed on a print medium. On the print medium 140 of FIG. 15, a text 140a and a two-dimensional code 140b are printed, where the text 140a includes a detailed description of a competition in celebration of the second anniversary of founding, and the two-dimensional code 140b includes information concerning automatic application for the competition.

The example of the fourth operation is explained below with reference to FIG. 14.

In step S70, when the user scans the two-dimensional code 140b printed on the print medium 140 as illustrated in FIG. 15, by using the handheld scanner 50 or the flat-bed scanner 51, the image data of the two-dimensional code 140b is input into the information processing apparatus 60. That is, the CPU 60a acquires the image data output from the handheld scanner 50 or the flat-bed scanner 51, and temporarily stores the image data, for example, in the RAM 60c.

In step S71, the CPU 60a extracts, from the image data temporarily stored in the RAM 60c, a portion of the image data corresponding to the header information 140b-1, and decodes the extracted portion to regenerate the header information 140b-1.

In step S72, the CPU 60a retrieves history information stored in the hard disk 60d, where the history information indicates whether or not the user has already applied for the competition.

In step S73, the CPU 60a determines whether or not the user has already applied for the competition, based on the history information. When yes is determined, the operation is completed, and when no is determined, the operation goes to step S74.

In step S74, the CPU 60a refers to the field "record areas" 85c (as illustrated in FIG. 6) in the decoded header information 140b-1 to obtain information on the area in which an application form 140b-2 is stored. Then, the CPU 60a acquires a portion of the image data in the area of the application form 140b-2, from the image data temporarily stored in the RAM 60c, decodes the acquired portion of the image data to regenerate the application form 140b-2, and produces the application form 140b-2 in the RAM 60c.

In step S75, the CPU 60a acquires user information from the hard disk 60d.

In step S76, the CPU 60a fills the application form 140b-2 in the RAM 60c, with personal information concerning the user. That is, the application form (an electronic mail) is filled by selecting appropriate personal information corresponding to tags embedded in the application form 140b-2, from the personal information stored in the hard disk 60d, and embedding the selected personal information in the application form.

Figure 16:
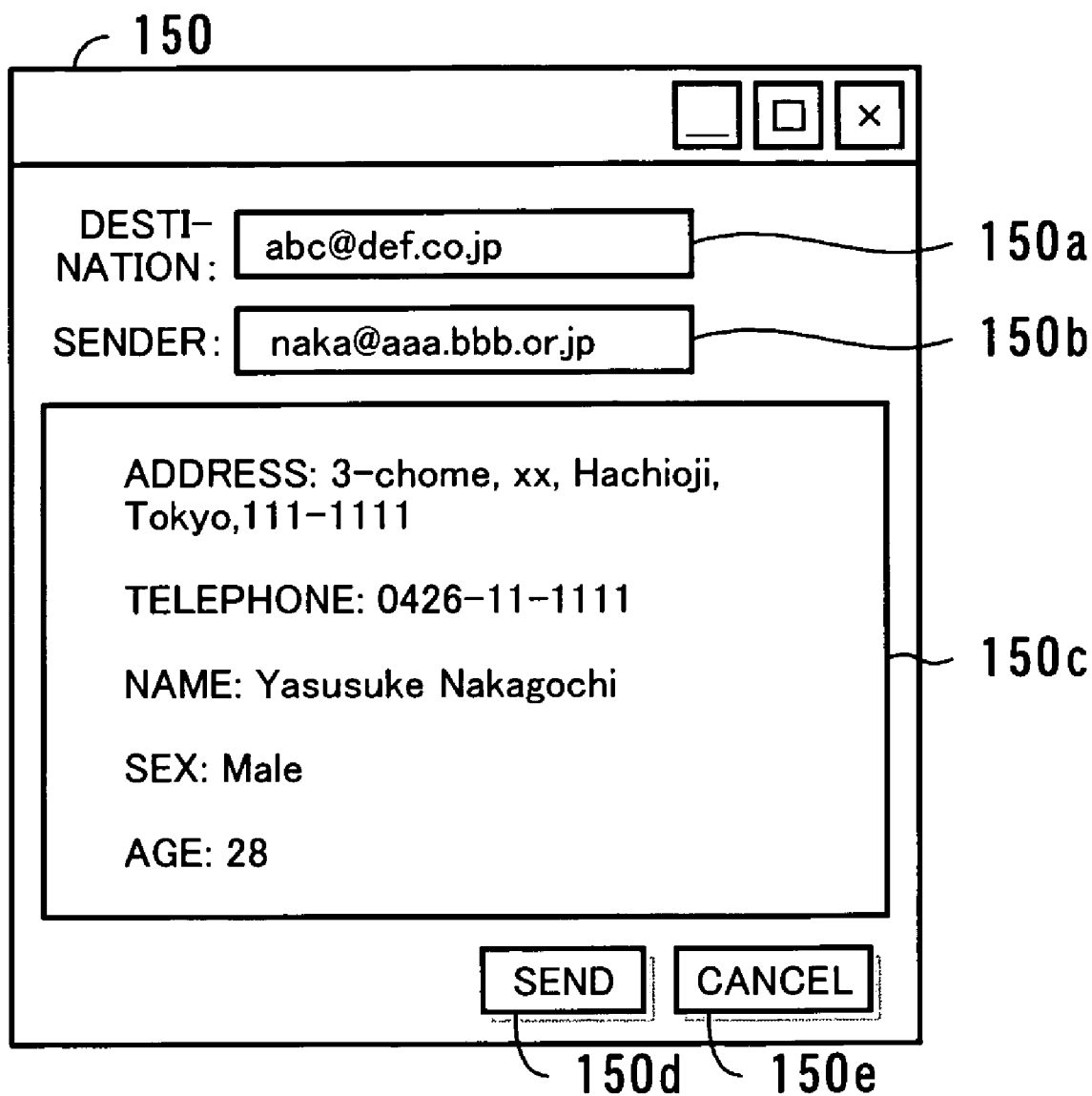
FIG. 16 is a diagram illustrating an example of an electronic mail produced in the operation of FIG. 14.

FIG. 16 is a diagram illustrating an example of the application form produced as a result of the above operation of FIG. 14. The application form of FIG. 16 includes fields of a destination 150a, a sender 150b, information 150c to be sent, a "send" button 150d, and a "cancel" button 150e. The destination 150a is a mail address of the sponsor of the competition, and the sender 150b is a mail address of the user. The information 150c to be sent includes the address, telephone number, name, distinction of sex, and age of the user. The "send" button 150d is a button to be pressed when the user wishes to send an electronic mail including currently displayed contents, and the "cancel" button 150e is a button to be pressed when the user wishes to cancel transmission of the electronic mail.

In step S77, the CPU 60a determines whether or not the produced electronic mail is to be sent. When yes is determined, the operation goes to step S78, and when no is determined, the operation is completed. For example, when the "send" button 150d is pressed, the operation goes to step S78, and when the "cancel" button 150e is pressed, the operation is completed.

In step S78, the CPU 60a supplies the produced electronic mail to the modem 72 for sending the produced electronic mail through the Internet 73. When transmission of the electronic mail is completed, the CPU 60a generates an item of history information indicating that the user has applied for the competition, and stores the generated item of history information in the hard disk 60d.

As described above, in the fourth operation, an electronic mail can be automatically produced in accordance with information recorded on the print medium, and can be transmitted in accordance with an instruction of the user. In addition, since the production of the electronic mail is prevented when the history information indicates that the user has applied for the competition, it is possible to avoid repeated transmission of application for the competition.

(7) Fifth Operation

Figure 17:
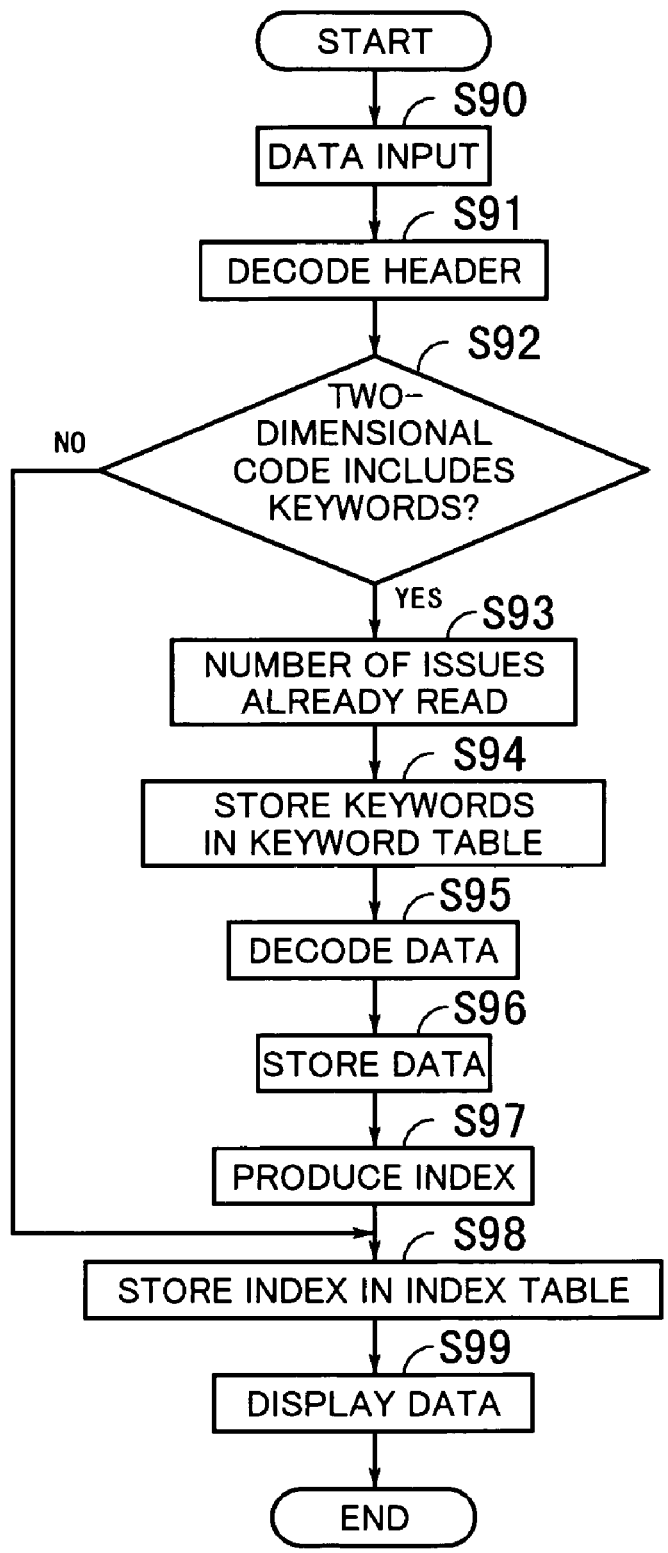
FIG. 17 is a flowchart illustrating an example of the fifth operation performed in the information processing system of FIG. 3.

FIG. 17 is a flowchart illustrating an example of the fifth operation performed in the information processing system of FIG. 3. In the operation of FIG. 17, the information processing apparatus acquires keywords included in human-readable information and machine-readable code information printed on a print medium, and produces a keyword table and an index table. The operation of FIG. 17 is started when the user scans the two-dimensional code 160b printed on the print medium 160 as illustrated in FIG. 18, by using the handheld scanner 50 or the flat-bed scanner 51.

Figure 18:
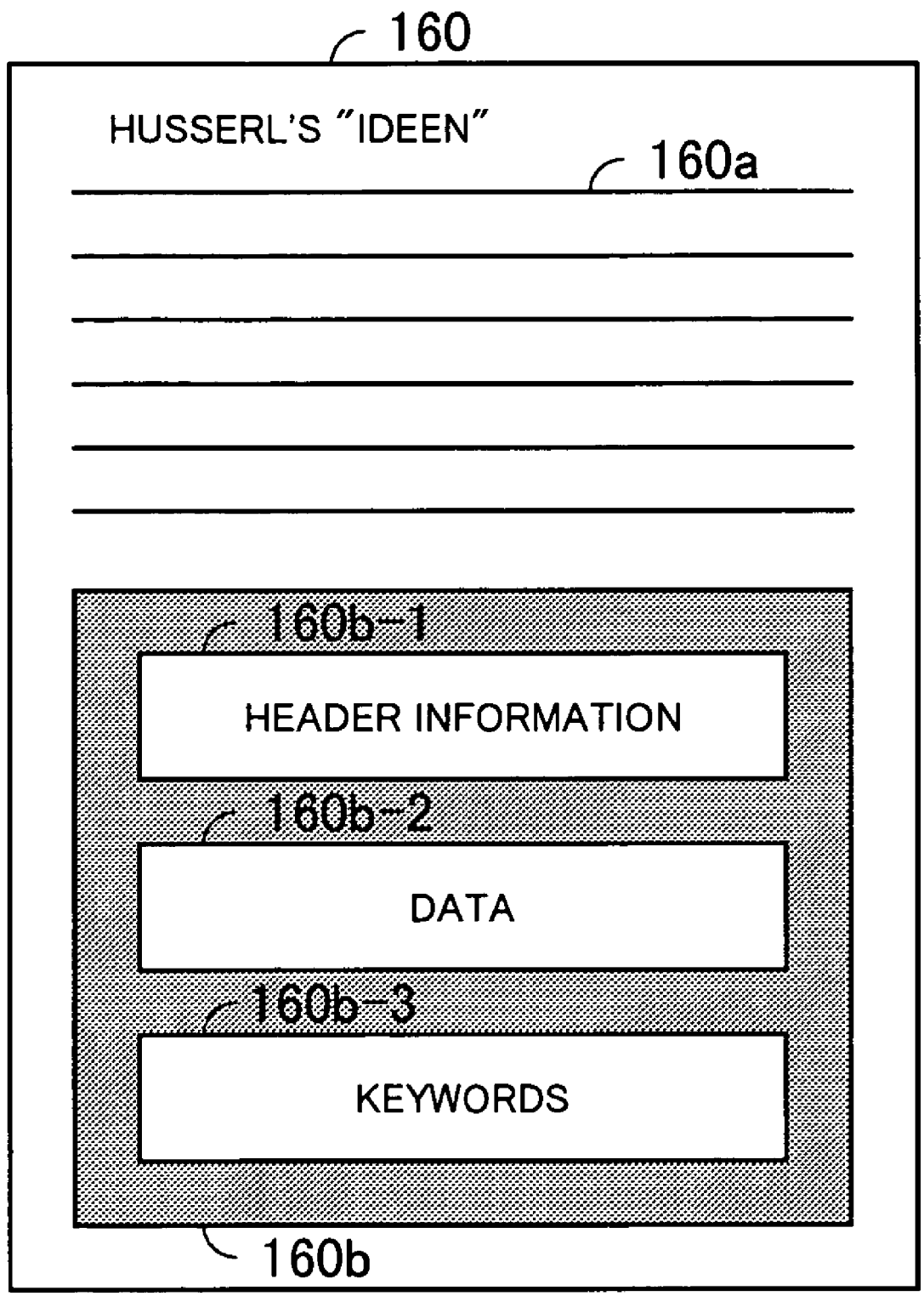
FIG. 18 is a diagram illustrating the fifth example of information printed on a print medium.

FIG. 18 is a diagram illustrating the fifth example of information printed on a print medium. On the print medium 160 of FIG. 18, a text 160a and a two-dimensional code 160b are printed, where the text 160a includes an article titled "Husserl's Ideen", and the two-dimensional code 160b includes information related to the article. The two-dimensional code 160b includes header information 160b-1, additional data 160b-2, and keywords 160b-3. The header information 160b-1 includes data indicating details of the information included in the two-dimensional code 160b, and the additional data 160b-2 include, for example, data which supplement the text 160a. The keywords 160b-3 include keywords in the contents of the text 160a or the additional data 160b-2.

The keywords of the text 160a can be automatically obtained by extracting words by morphological analysis of the text 160a, and further extracting frequently-appearing nouns from the extracted words. Alternatively, the keywords of the text 160a can be obtained by manual extraction by a writer or editor of the article.

The example of the fifth operation is explained below with reference to FIG. 17.

In step S90, when the user scans the two-dimensional code 160b printed on the print medium 160 as illustrated in FIG. 18, by using the handheld scanner 50 or the flat-bed scanner 51, the image data of the two-dimensional code 160b is input into the information processing apparatus 60. That is, the CPU 60a acquires the image data output from the handheld scanner 50 or the flat-bed scanner 51, and temporarily stores the image data, for example, in the RAM 60c.

In step S91, the CPU 60a extracts, from a portion of the image data corresponding to the header information 160b-1, and decodes the extracted portion to regenerate the header information 160b-1.

In step S92, the CPU 60a refers to the header information 160b-1, and determines whether or not the two-dimensional code 160b includes keywords. When yes is determined, the operation goes to step S93, and when no is determined, the operation goes to step S99.

In step S93, the CPU 60a extracts a portion, corresponding to the keywords 160b-3, of the image data of the two-dimensional code 160b, and decodes the extracted portion of the image data to regenerate the keywords 160b-3.

In step S94, the CPU 60a stores the regenerated keywords 160b-3, in a keyword table which is stored in the hard disk 60d. FIG. 19 is a diagram illustrating an example of the keyword table produced in the operation of FIG. 17. In the keyword table of FIG. 19, "Edmund Husserl", "Ideen", and the like are stored as the keywords.

In step S95, the CPU 60a refers to the decoded header information 160b-1 to obtain information on the area in which the additional data 160b-2 is stored. Then, the CPU 60a acquires a portion of the image data in the area of the additional data 160b-2, from the image data temporarily stored in the RAM 60c, and decodes the acquired portion of the image data to regenerate the additional data 160b-2.

In step S96, the CPU 60a stores the decoded additional data 160b-2 in a predetermined area in the hard disk 60d.

In step S97, the CPU 60a produces an index by associating data items with keywords. For example, the CPU 60a may produce an index by associating a data item 1 included in the additional data 160b-2 with the keyword indicated in FIG. 19.

In step S98, the CPU 60a stores the index produced in step S97 in an index table which is stored in the hard disk 60d. FIG. 20 is a diagram illustrating an example of the index table produced in the operation of FIG. 17. In the index table of FIG. 20, a data item having a data name "DATA 1" is associated with a group of keywords "Edmund Husserl, Ideen, phenomenology, . . . ", a data item having a data name "DATA 2" is associated with a group of keywords "Wittgenstein, Tractatus, Language Game, . . . ", and a data item having a data name "DATA 3" is associated with a group of keywords "modern music, theremin, Schnittke, . . . ."

In step S99, the CPU 60a supplies the data regenerated in step S95, to the CRT monitor 70 to display the regenerated data.

As described above, in the fifth operation, when image data of a two-dimensional code including keywords are input, the information processing apparatus automatically produces a keyword table (for example, as illustrated in FIG. 19) and an index table (for example, as illustrated in FIG. 20).

Since it is considered that there is close relationship between each keyword group in the keyword table and the user's interest, it is possible to perform the sixth and seventh operations by using the keywords, as explained below.

(8) Sixth Operation

When the index table is produced as described with reference to FIG. 18, the index table contains data items respectively associated with keyword groups, and the data items are related to information which has been previously referred to. Therefore, it is possible to select and refer to desired data from among information which has been previously referred to, by a keyword search.

Figure 21:
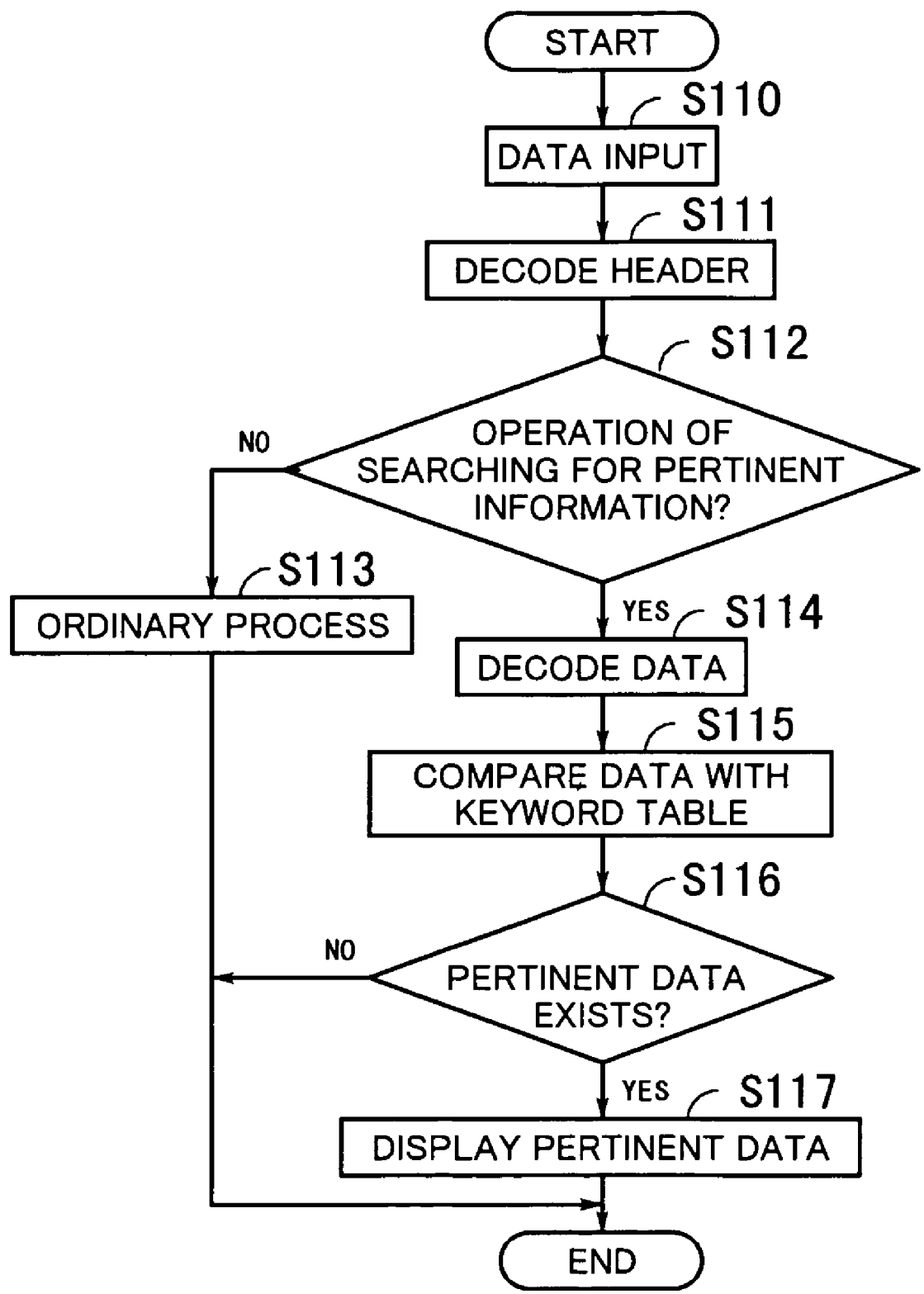
FIG. 21 is a flowchart illustrating an example of the sixth operation performed in the information processing system of FIG. 3.

FIG. 21 is a flowchart illustrating an example of the sixth operation performed in the information processing system of FIG. 3. In the operation of FIG. 21, a data item which is estimated to be of interest to the user is automatically selected to be displayed, from among data items included in a two-dimensional code read from a print medium, by using the keyword table (as illustrated in FIG. 19) produced by the fifth operation of FIG. 17. The operation of FIG. 21 is started when the user scans the two-dimensional code 170b printed on the print medium 170 as illustrated in FIG. 22, by using the handheld scanner 50 or the flat-bed scanner 51.

Figure 22:
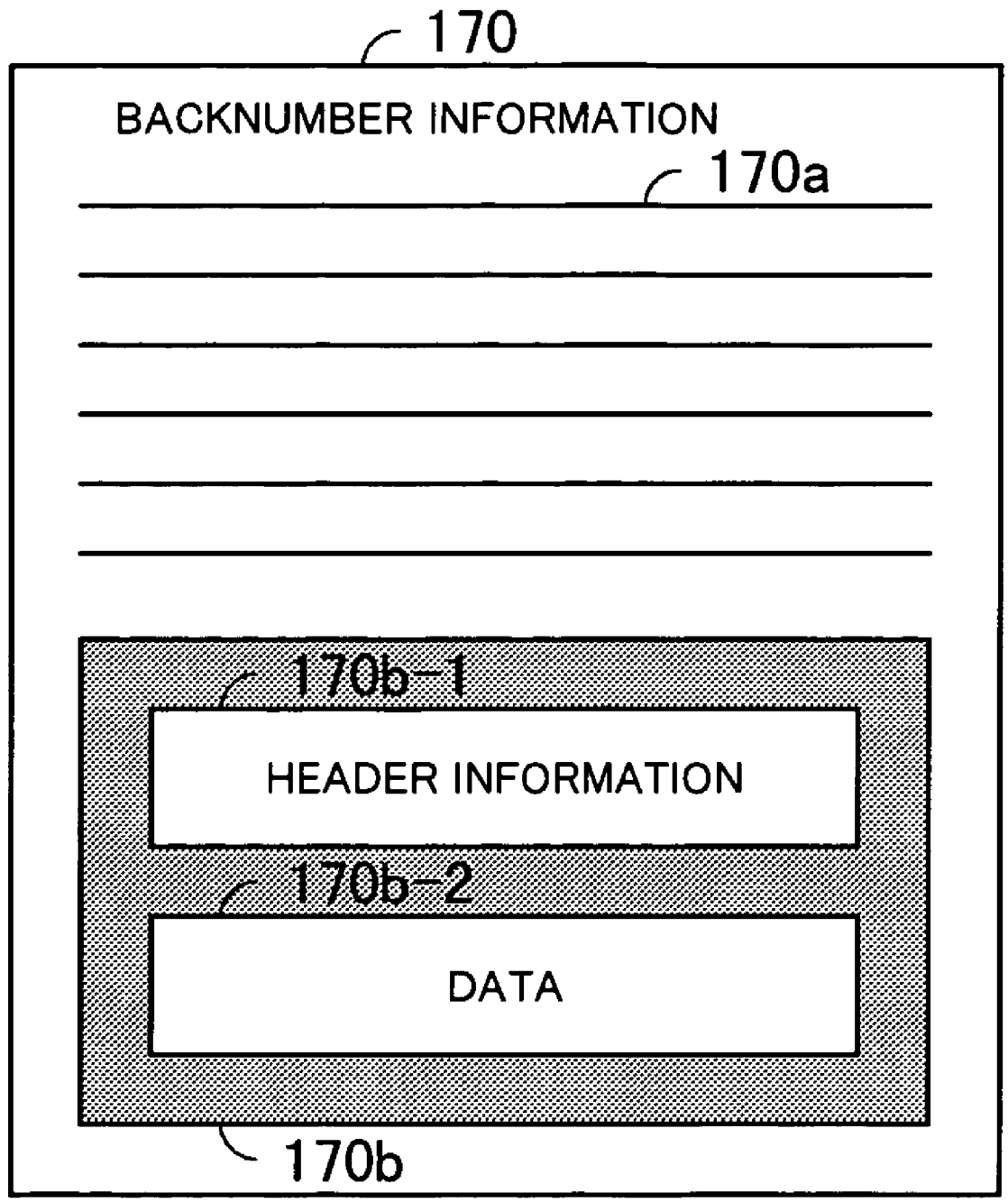
FIG. 22 is a diagram illustrating the sixth example of information printed on a print medium.

FIG. 22 is a diagram illustrating the sixth example of information printed on a print medium. On the print medium 170 of FIG. 22, human-readable information 170a and a two-dimensional code 170b are printed, where human-readable information 170a includes information on backnumbers of a predetermined magazine issued for the past year, and the two-dimensional code 170b includes header information 170b-1 and additional data 170b-2. The additional data 170b-2 include, for example, backnumbers and their contents.

The example of the sixth operation is explained below with reference to FIG. 21.

In step S110, when the user scans the two-dimensional code 170b printed on the print medium 170 as illustrated in FIG. 22, by using the handheld scanner 50 or the flat-bed scanner 51, the image data of the two-dimensional code 170b is input into the information processing apparatus 60. That is, the CPU 60a acquires the image data output from the handheld scanner 50 or the flat-bed scanner 51, and temporarily stores the image data, for example, in the RAM 60c.

In step S111, the CPU 60a extracts, from a portion of the image data corresponding to the header information 170b-1, and decodes the extracted portion to regenerate the header information 170b-1.

In step S112, the CPU 60a refers to the field "details of processing" 85d (as illustrated in FIG. 6) in the decoded header information 170b-1, and determines whether or not an operation of searching for pertinent information is required to be performed on the data included in the two-dimensional code 170b. When yes is determined, the operation goes to step S114, and when no is determined, the operation goes to step S113.

In step S113, the CPU 60a executes processing which should be executed when the operation of searching for pertinent information is not required to be performed on the data included in the two-dimensional code 170b. For example, the CPU 60a decodes the two-dimensional code 170c to regenerate the original information, and supplies the regenerated information, for example, to the CRT monitor 70, the speaker 71, the modem 72, and the like.

In step S114, the CPU 60a refers to the field "record areas" 85c (as illustrated in FIG. 6) in the decoded header information 170b-1, and obtains information on the area in which the additional data 170b-2 is stored. Then, the CPU 60a acquires a portion of the image data in the area of the additional data 170b-2, from the image data temporarily stored in the RAM 60c, and decodes the acquired portion of the image data to regenerate the additional data 170b-2.

In step S115, the CPU 60a compares data items in the decoded additional data 170b-2 with the keywords included in the keyword table of FIG. 19.

In step S116, the CPU 60a determines whether or not the regenerated additional data 170b-2 includes a data item including at least one word which is identical with one of the keywords included in the keyword table in FIG. 19. When yes is determined, the operation goes to step S117, and when no is determined, the operation is completed.

In step S117, the CPU 60a supplies to the CRT monitor 70 the above data item (information on a backnumber) including the word which is identical with the keyword, so as to display the data item on the CRT monitor 70.

Figure 23:
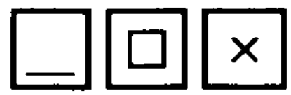
FIG. 23 is a diagram illustrating an example of an image displayed by the CRT monitor as a result of the operation of FIG. 21.

FIG. 23 is a diagram illustrating an example of an image displayed by the CRT monitor as a result of the operation of FIG. 21. In the example of FIG. 23, three data items among data items included in the additional data 170b-2 are displayed, where each of the three data items includes at least one word which is identical with one of the keywords included in the keyword table in FIG. 19. That is, information on the December issue which includes the keyword "Edmund Husserl", information on the February issue which includes the keywords "phenomenology" and "Merleau-Ponty", and information on the June issue which includes the keyword "phenomenology" are displayed.

Further provision may be made for preparing and sending an order for one of the displayed backnumbers. For example, provision may be made so that a window for preparing and sending an order is displayed when the user selects one of the backnumbers displayed in the window 180 in FIG. 23 by the input device 52. Processing for preparing and sending an order may be performed in a similar manner to the processing of automatically producing an electronic mail and sending the electronic mail through the modem 72 in the operation of FIG. 14.

As described above, in the sixth operation, information which is to be displayed is determined based on keywords included in information which has been previously referred to. Therefore, it is possible to automatically select and display information which has great value for the user.

(9) Seventh Operation

Figure 24:
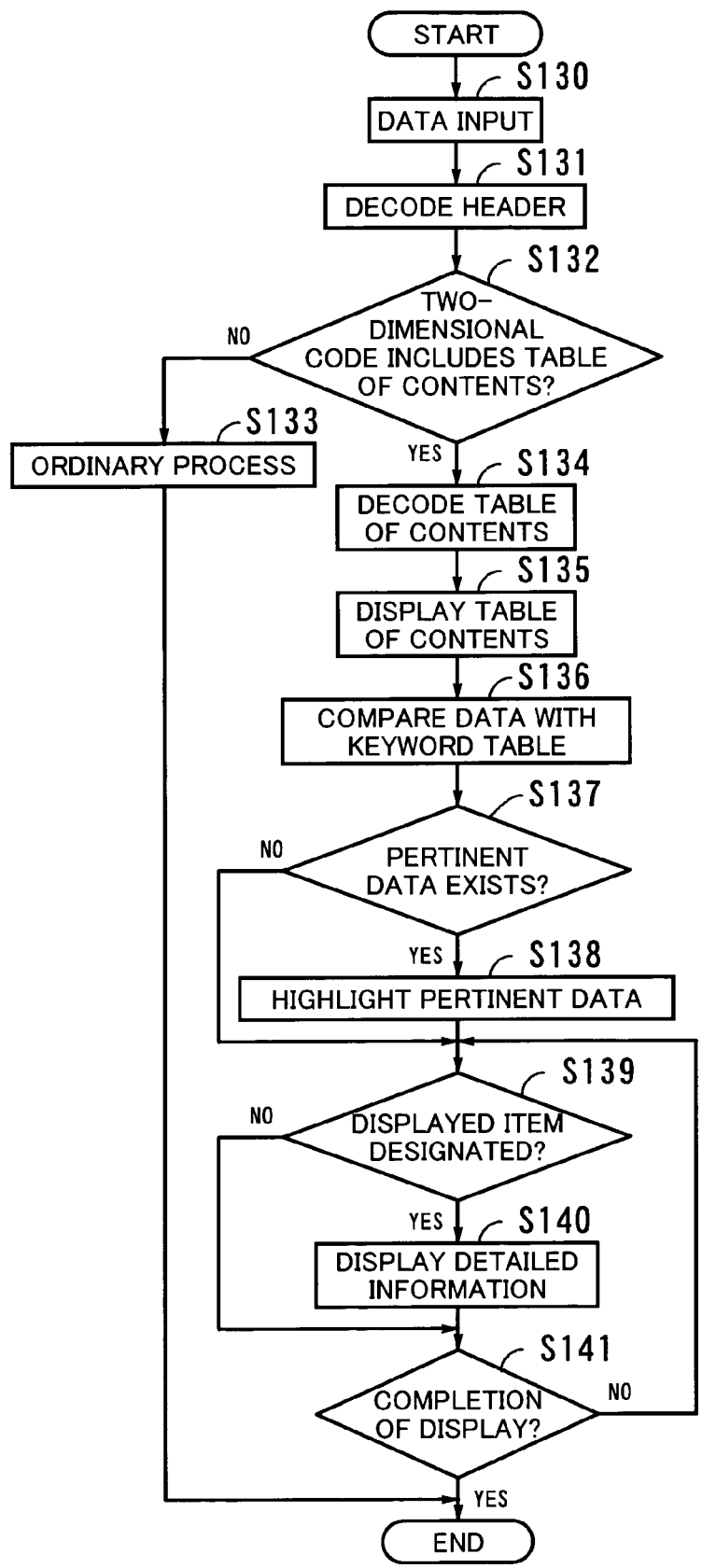
FIG. 24 is a flowchart illustrating an example of the seventh operation performed in the information processing system of FIG. 3.

FIG. 24 is a flowchart illustrating an example of the seventh operation performed in the information processing system of FIG. 3. In the operation of FIG. 24, an information item which is estimated to be of interest to the user, among information items included in a two-dimensional code, is highlighted based on the keyword table (as indicated in FIG. 19) which is produced in the operation of FIG. 17. The information items included in a two-dimensional code are, for example, indexes or a table of contents of a magazine. The operation of FIG. 24 is started when the user scans the two-dimensional code 190b printed on the print medium 190 as illustrated in FIG. 25, by using the handheld scanner 50 or the flat-bed scanner 51.

FIG. 25 is a diagram illustrating the seventh example of information printed on a print medium. On the print medium 190 of FIG. 25, human-readable information 190a and a two-dimensional code 190b are printed, where the two-dimensional code 190b includes information on a table of contents of a predetermined magazine.

The example of the seventh operation is explained below with reference to FIG. 24.

In step S130, when the user scans the two-dimensional code 190b printed on the print medium 190 as illustrated in FIG. 25, by using the handheld scanner 50 or the flat-bed scanner 51, the image data of the two-dimensional code 190b is input into the information processing apparatus 60. That is, the CPU 60a acquires the image data output from the handheld scanner 50 or the flat-bed scanner 51, and temporarily stores the image data, for example, in the RAM 60c.

In step S131, the CPU 60a extracts, from a portion of the image data corresponding to the header information 190b-1, and decodes the extracted portion to regenerate the header information 190b-1.

In step S132, the CPU 60a refers to the field "record data types" 85b (as illustrated in FIG. 6) in the decoded header information 190b-1, and determines whether or not the two-dimensional code 190b includes the above table of contents. When yes is determined, the operation goes to step S134, and when no is determined, the operation goes to step S133.

In step S133, the CPU 60a executes processing which should be executed when the two-dimensional code 190b does not include the table of contents. For example, the CPU 60a decodes the two-dimensional code 190c to regenerate the original information, and supplies the regenerated information, for example, to the CRT monitor 70, the speaker 71, the modem 72, and the like.

In step S134, the CPU 60a refers to the field "record areas" 85c (as illustrated in FIG. 6) in the decoded header information 190b-1, and obtains information on the area in which the additional data 190b-2 is stored. Then, the CPU 60a acquires a portion of the image data in the area of the additional data 190b-2, from the image data temporarily stored in the RAM 60c, and decodes the acquired portion of the image data to regenerate the table of contents of the magazine.

In step S135, the CPU 60a supplies the regenerated table of contents to the CRT monitor 70 to display the regenerated table of contents.

In step S136, the CPU 60a compares contents of the regenerated table of contents with the keywords included in the keyword table of FIG. 19.

In step S137, the CPU 60a determines whether or not the regenerated table of contents includes one of the keywords included in the keyword table in FIG. 19. When yes is determined, the operation goes to step S138, and when no is determined, the operation goes to step S139.

In step S138, the CPU 60a highlights at least one portion of the table of contents which includes at least one of the keyword, in the display of the table of contents on the CRT monitor 70.

Figure 26:
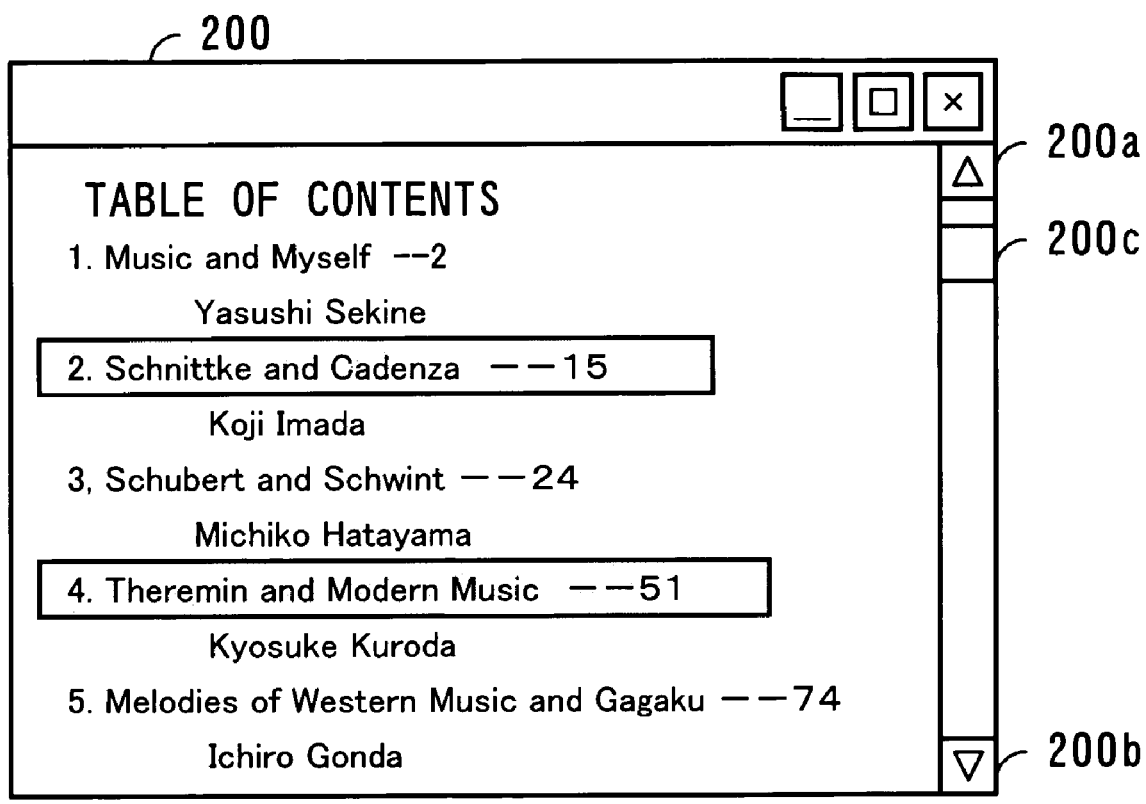
FIG. 26 is a diagram illustrating an example of a window 200 displayed by the CRT monitor as a result of the operation of FIG. 24.

FIG. 26 is a diagram illustrating an example of a window 200 displayed by the CRT monitor as a result of the operation of FIG. 24. In the example of FIG. 26, a window 200 including a table of contents is displayed. Among the items of the table of contents, the second item "2. Schnittke and cadenza—15" and the fourth item "4. Theremin and Modern Music—51" are highlighted. The display can be scrolled in the up and down directions by manipulating the scroll arrows 200a and 200b and the scroll box 200c.

In step S139, the CPU 60a determines whether or not one of the items displayed on the CRT monitor 70 is designated by manipulation of the input device 52 by the user. When yes is determined, the operation goes to step S140, and when no is determined, the operation goes to step S141.

In step S140, the central processing unit (CPU) 60a supplies detailed information on the designated item to the CRT monitor 70 to display the detailed information on the designated item. Since the table of contents is described by HTML (Hypertext Markup Language) or the like, the designated item can be identified by referring to a tag located at the position of the designated item.

FIG. 27 is a diagram illustrating an example of a window 210 displayed by the CRT monitor when the item "Theremin and Modern Music—51" is selected in the window 200 in FIG. 26. In the example of FIG. 27, the subwindow 210 is displayed in addition to the window 200. In the subwindow 210, a detailed explanation on the above item "Theremin and Modern Music—51" is displayed.

When the underlined word "theremin" is further designated in the subwindow 210, the subwindow 215 illustrated in FIG. 28 is displayed. The subwindow 215 shows the location in the magazine in which information related to the designated word "theremin" is provided. In this example, the subwindow 215 shows that an explanation related to the word "theremin" is provided on page 52 in the human-readable form, and image data related to the word "theremin" is provided on page 52, lower column, in the form of a two-dimensional code.

In step S141, the CPU 60a determines whether or not the close button in one of the windows is manipulated by the user, where the close button is provided at the upper right corner of each window with a symbol "X". When yes is determined, the CPU 60a completes the operation. When no is determined, the operation goes to step S139.

Although the above explanation is provided for the case wherein the two-dimensional code includes information on the table of contents of a magazine, a similar operation can be performed when the two-dimensional code includes information on indexes of the magazine.

As described above, in the seventh operation, first, information included in the two-dimensional code is displayed, and at least one item in the displayed information, including at least one keyword in the keyword table, is highlighted, the user can easily find an information item which the user is interested in. In addition, when a portion of the display information is designated, details of the designated portion are displayed, and the location in the print medium in which information related to the designated portion is provided is indicated. Therefore, the user can quickly search for desired information.

(10) Eighth Operation

Figure 29:
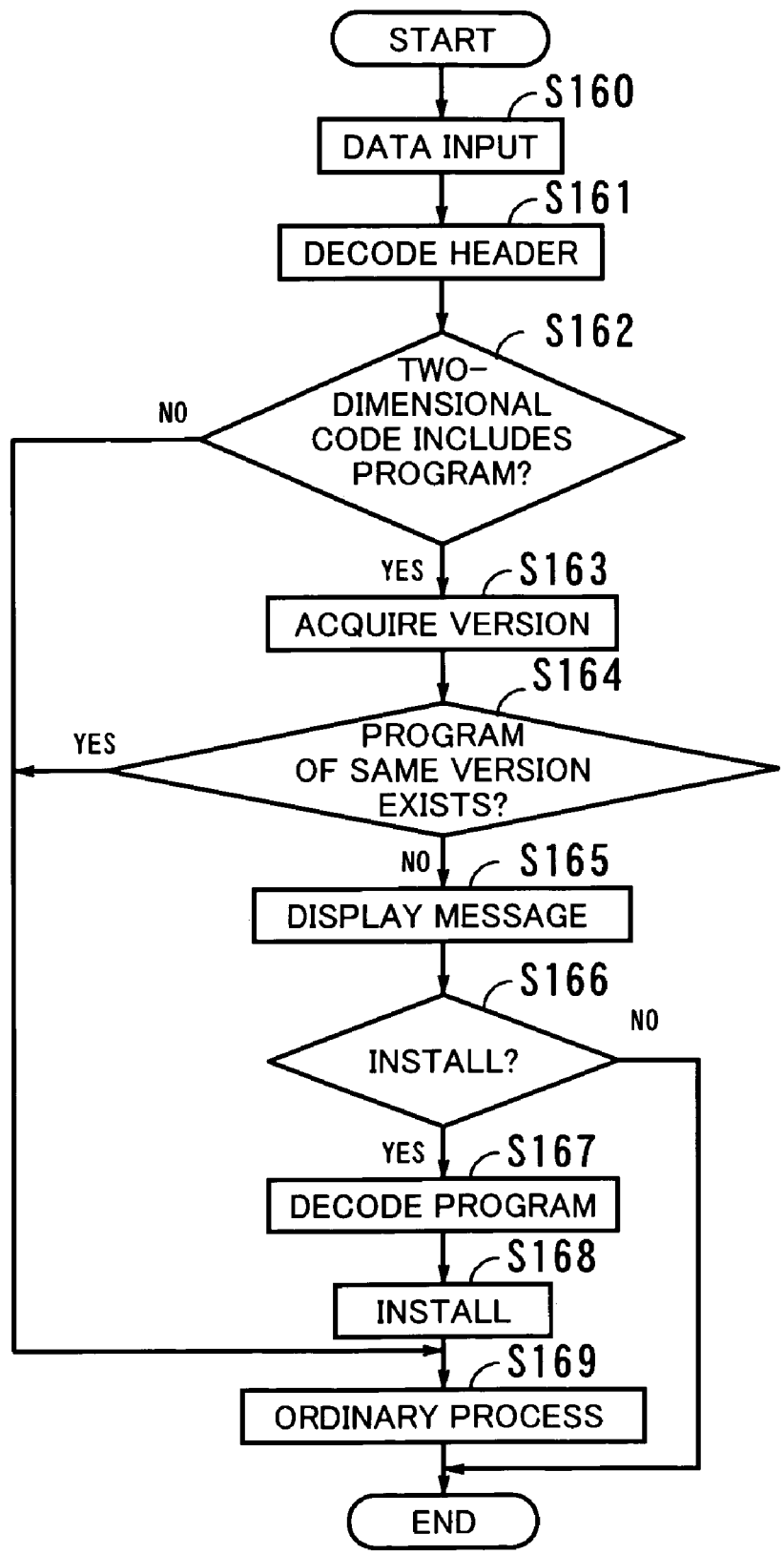
FIG. 29 is a flowchart illustrating an example of the eighth operation performed in the information processing system of FIG. 3.

FIG. 29 is a flowchart illustrating an example of the eighth operation performed in the information processing system of FIG. 3. In the operation of FIG. 29, when a two-dimensional code including a certain application program is read in, the information processing apparatus determines whether or not the application program is already installed in the hard disk 60d in the information processing apparatus 60. If the application program is not installed in the hard disk 60d, processing of installing the application program included in the two-dimensional code in the hard disk 60d is performed based on an instruction of the user. The operation of FIG. 29 is started when the user scans the two-dimensional code 190b printed on the print medium 190 as illustrated in FIG. 30, by using the handheld scanner 50 or the flat-bed scanner 51.

Figure 30:
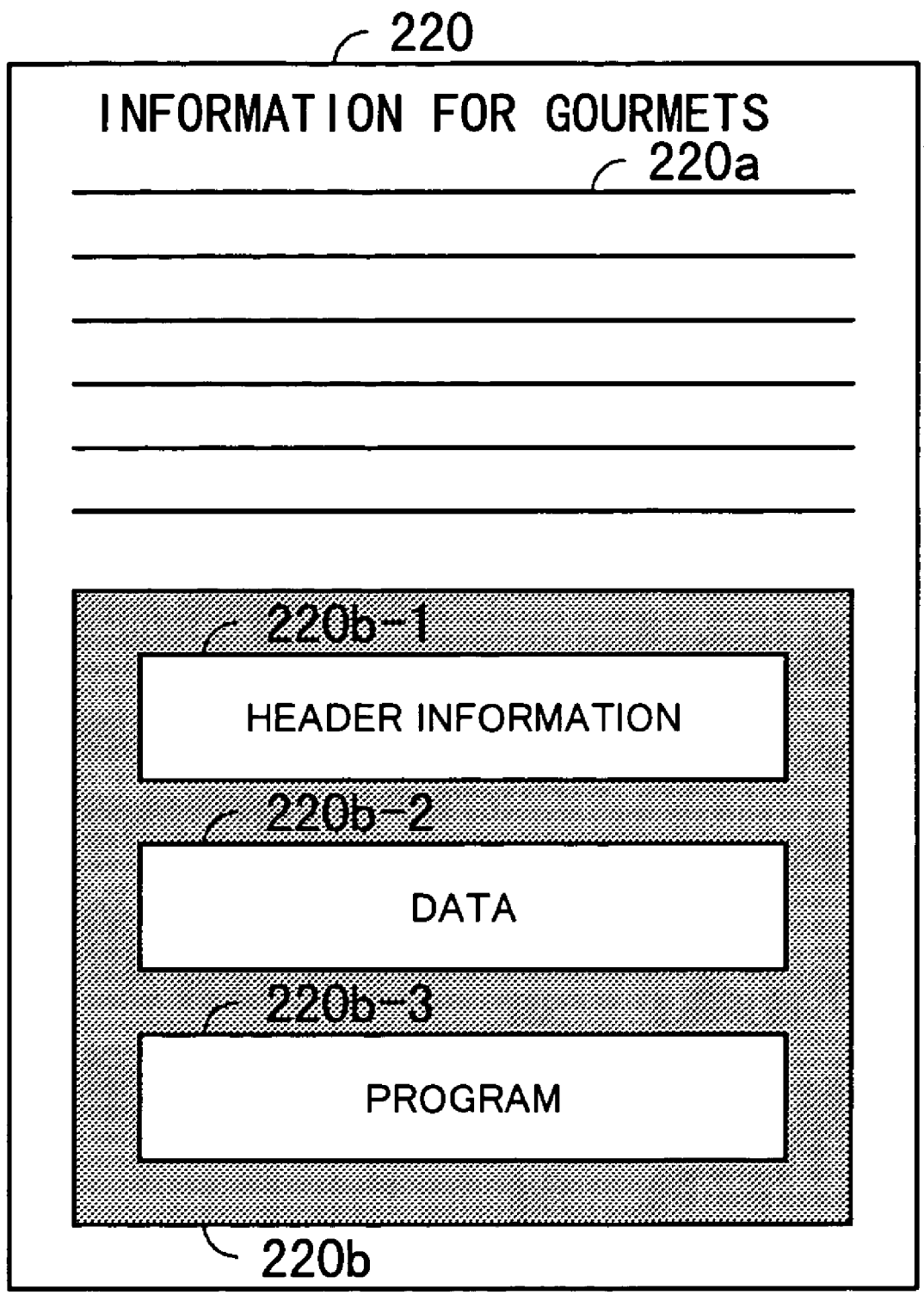
FIG. 30 is a diagram illustrating the eighth example of information printed on a print medium.

FIG. 30 is a diagram illustrating the eighth example of information printed on a print medium. On the print medium 220 of FIG. 30, human-readable information 220a and a two-dimensional code 220b are printed, where human-readable information 220a includes, for example, information for gourmets, and the two-dimensional code 220b includes header information 220b-1, additional data 220b-2, and a program 220b-3 which is used for processing of information included in the two-dimensional code 220b. The additional data 220b-2 relate to the information for gourmets included in the human-readable information 220a.

The example of the sixth operation is explained below with reference to FIG. 29.

In step S160, when the user scans the two-dimensional code 220b printed on the print medium 220 as illustrated in FIG. 30, by using the handheld scanner 50 or the flat-bed scanner 51, the image data of the two-dimensional code 220b is input into the information processing apparatus 60. That is, the CPU 60a acquires the image data output from the handheld scanner 50 or the flat-bed scanner 51, and temporarily stores the image data, for example, in the RAM 60c.

In step S161, the CPU 60a extracts, from a portion of the image data corresponding to the header information 220b-1, and decodes the extracted portion to regenerate the header information 220b-1.

In step S162, the CPU 60a refers to the field "record data types" 85b (as illustrated in FIG. 6) in the decoded header information 220b-1, and determines whether or not the two-dimensional code 220b includes the above application program. When yes is determined, the operation goes to step S163, and when no is determined, the operation goes to step S169.

In step S163, the CPU 60a acquires information on the version of the application program included in the two-dimensional code 220b. The information on the version may be included, for example, in the field "other information" 85f (as illustrated in FIG. 6) in the header information 220b-1.

In step S164, the CPU 60a refers to the hard disk 60d, and determines whether or not the application program of the same version as that included in the two-dimensional code 220b is installed in the hard disk 60d. When yes is determined, the operation goes to step S169, and when no is determined, the operation goes to step S165.

In step S165, the CPU 60a makes the CRT monitor 70 display a message prompting the user to instruct whether or not the application program in the two-dimensional code 220b is to be installed.

Figure 31:
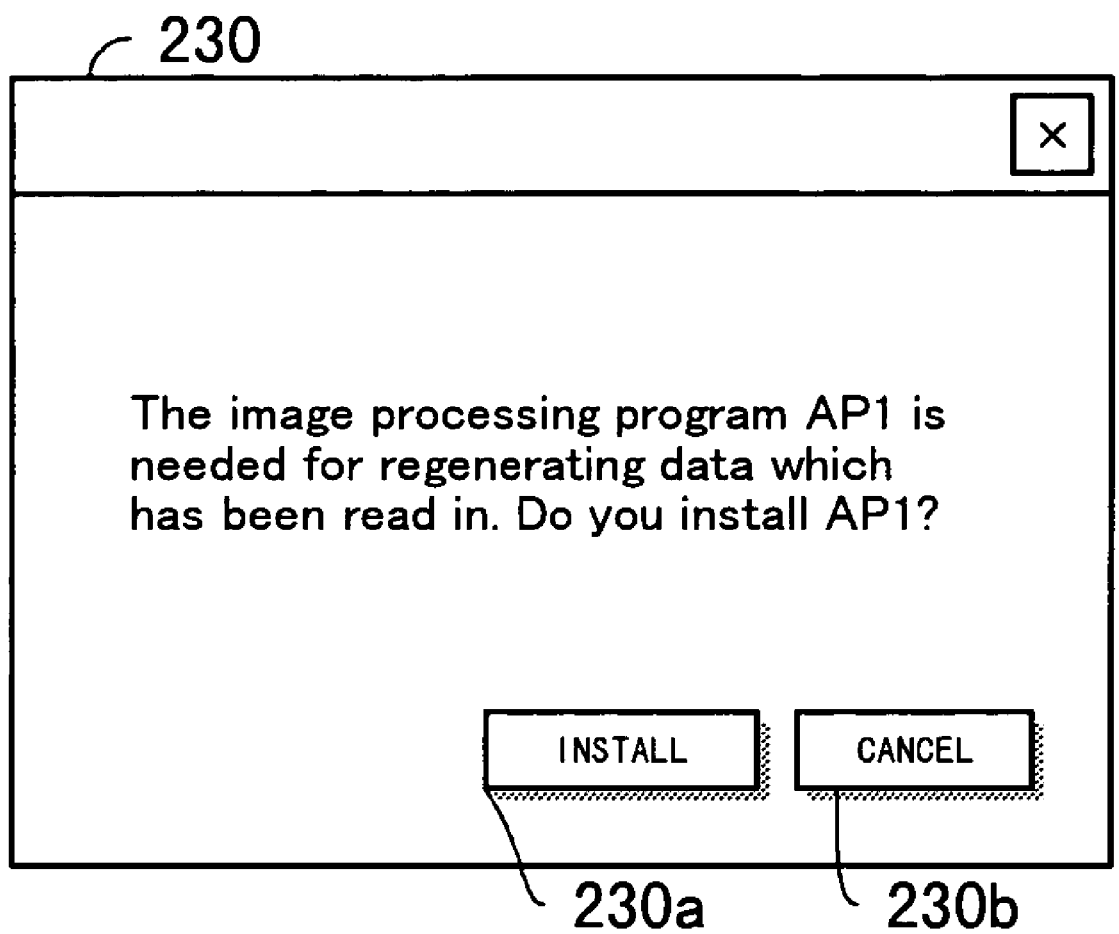
FIG. 31 is a diagram illustrating an example of a window 230 displayed by the CRT monitor as a result of the operation of FIG. 29.

FIG. 31 is a diagram illustrating an example of a window 230 displayed by the CRT monitor as a result of the operation of FIG. 29. The displayed window 230 in the example of FIG. 31 includes a message which indicates the necessity of the installation of the application program AP1, and prompts the user to instruct whether or not the application program in the two-dimensional code 220b is to be installed. When the user presses the "Install" button provided in the window 230, the application program AP1 is installed in the hard disk 60d, and when the user presses the "Cancel" button, the application program AP1 is installed in the hard disk 60d.

In step S166, the CPU 60a determines whether or not the application program AP1 is to be installed in the hard disk 60d (and whether or not the application program installed in the hard disk 60d is to be updated with the application program AP1 included in the two-dimensional code). When yes is determined, the operation goes to step S167, and when no is determined, the operation is completed. That is, when the "Install" button is pressed, the operation goes to step S167, and when the "Cancel" button is pressed, the operation is completed.

In step S167, the CPU 60a refers to the field "record areas" 85c (as illustrated in FIG. 6) in the decoded header information 220b-1, and obtains information on the area in which the program 220b-3 is stored. Then, the CPU 60a acquires a portion of the image data in the area of the program 220b-3, from the image data temporarily stored in the RAM 60c, and decodes the acquired portion of the image data to regenerate the program 220b-3.

In step S168, the CPU 60a installs the decoded application program in the hard disk 60d.

In step S169, the CPU 60a executes ordinary processing on the data of the two-dimensional code 220b, and then completes the operation.

As described above, in the seventh operation, when a two-dimensional code including a certain application program is read in, the information processing apparatus determines whether or not the application program is already installed in the hard disk 60d in the information processing apparatus. If the application program is not installed in the information processing apparatus, the application program included in the two-dimensional code can be installed based on an instruction of the user. Therefore, since the two-dimensional code includes data and a program for utilizing the data, the user can refer to the data even when a special program is needed for utilizing the data included in the two-dimensional code, and the special program is not installed in the information processing apparatus.

(11) Others

As described above, according to the embodiment of the present invention, the user can easily refer to and utilize additional information printed in the form of a two-dimensional code on a print medium on which human-readable information is also printed.

In addition, the human-readable information and the additional information can be referred to based on relationship between the additional information and human-readable information.

Further, the functions of the information processing apparatus according to the present invention, including the functions realizing the above first to eighth operations, may be realized by using a certain product with an information processing apparatus, e.g., by installing a computer-readable medium in a computer. The product is such that when the product is used with an information processing apparatus (e.g., a computer), the product is able to output control information which directs the information processing apparatus to realize any of the above functions of the present invention including the functions realizing the above first to eighth operations. The product may be a semiconductor storage device storing a program realizing the above functions, such as a ROM, a magnetic storage medium such as a floppy disc or a hard disk, or a CD-ROM, a CD-R, a DVD-ROM, a DVD-RAM, a DVD-R, or the like. Further, the above product may be a programmed hardware logic circuit such as an LSI. The above product can be put into the market. Alternatively, program data realizing the above functions may be transferred through a communication network from a storage device included in a computer system to another computer system. When executing the program in a computer system, for example, the program stored in a hard disk drive may be loaded in a main memory of the computer system.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

In addition, all of the contents of the Japanese patent application, No. 11-156208 are incorporated into this specification by reference.

What is claimed is:

1. An information processing apparatus, comprising:
   a decoder to decode a print medium with printed human readable information, which includes at least one of a text data or image data, and with printed two-dimensional machine-readable code information, which comprises header information including a list of contents of information printed on the print medium, text data and at least one of image data, sound data, program data or any combination thereof, to generate decoded information;
   a header information storage to store at least a portion of said decoded information, as stored header information;
   an attribute storage to store attribute information on a user;
   an extractor to extract a portion of said two-dimensional machine-readable code information or said decoded information, based on said stored user attribute information and said stored header information; and
   a programmed processor to perform a process based on said stored user attribute information and at least one of said decoded information or said stored header information.

2. An information processing apparatus according to claim 1, wherein said extractor extracts said portion of said two-dimensional machine-readable code information or said decoded information, based on a result of process performed by the programmed processor.

3. An information processing apparatus according to claim 1, further comprising a processing program storage to store at least one processing program, wherein said programmed processor selects, based on said portion extracted by said extractor, one of said at least one processing program for performing said process.

4. An information processing apparatus according to claim 3, wherein said extractor extracts said portion of said two-dimensional machine-readable code information or said decoded information, based on said at least one processing program stored in said processing program storage.

5. An information processing apparatus according to claim 1, wherein said attribute storage further stores information on a system, and said extractor extracts said portion of said two-dimensional machine-readable code information or said decoded information, based on said stored system attribute information.

6. An information processing apparatus according to claim 1, wherein said attribute storage further stores information on a system, and said programmed processor determines said process to perform based on said store system attribute information.

7. An information processing apparatus, comprising:
   a decoder to decode a print medium having printed human readable information, which includes at least one of a text data or image data, and having printed two-dimensional machine-readable code information, which includes header information including a list of contents of information printed on the print medium, to generate decoded information, wherein the printed two-dimensional machine-readable code information represents the printed human-readable information;
   a header information storage to store at least a portion of said decoded information, as stored header information;
   an attribute storage to store attribute information on a user;
   an extractor to extract a portion of said two-dimensional machine-readable code information or said decoded information, based on said stored user attribute information and said stored header information; and
   a processor to display a decoded graph based on said stored user attribute information and at least one of said decoded information or said stored header information.

8. An information processing apparatus, comprising:
   a decoder to decode a print medium having printed human readable information as a periodical, which includes at least one of a text data or image data, and having printed two-dimensional machine-readable code information, which includes header information including a list of contents of information printed on the print medium, wherein the printed two-dimensional machine-readable code information represents the printed human-readable information, to generate decode information;
   a header information storage to store at least a portion of said decoded information as stored header information;
   an attribute storage to store attribute information on a user;
   an extractor to extract a portion of said two-dimensional machine-readable code information or said decoded information, based on said stored user attribute information and said stored header information; and
   a processor to display a decoded text related to the periodical according to a frequency of reading of the periodical by the user, based on said stored user attribute information and at least one of said decoded information or said stored header information.

* * * * *